US012749457B2

(12) United States Patent
Kim et al.

(10) Patent No.: US 12,749,457 B2
(45) Date of Patent: Sep. 29, 2026

(54) DRIVING CIRCUIT, DISPLAY APPARATUS, AND ELECTRONIC APPARATUS

(71) Applicant: Samsung Display Co., Ltd., Yongin-si (KR)

(72) Inventors: Yongchan Kim, Yongin-si (KR); Nackhyeon Keum, Yongin-si (KR); Kyunghoon Kim, Yongin-si (KR); Sanghun Kim, Yongin-si (KR); Seungjun Shin, Yongin-si (KR); Eseudeo Yun, Yongin-si (KR); Sukyo Jung, Yongin-si (KR); Jaewon Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/270,247

(22) Filed: Jul. 15, 2025

(65) Prior Publication Data

US 2026/0031050 A1 Jan. 29, 2026

(30) Foreign Application Priority Data

Jul. 25, 2024 (KR) ........................ 10-2024-0098963

(51) Int. Cl.
*G09G 3/3266* (2016.01)

(52) U.S. Cl.
CPC ... *G09G 3/3266* (2013.01); *G09G 2300/0819* (2013.01); *G09G 2310/08* (2013.01); *G09G 2330/02* (2013.01)

(58) Field of Classification Search
None
See application file for complete search history.

(56) References Cited

U.S. PATENT DOCUMENTS

| | | | | |
|---|---|---|---|---|
| 8,816,728 | B2 | 8/2014 | Yoon et al. | |
| 2017/0110050 | A1* | 4/2017 | Park | G09G 3/3208 |
| 2017/0186363 | A1* | 6/2017 | Park | G09G 3/3266 |
| 2021/0407429 | A1* | 12/2021 | Seo | G09G 3/3266 |
| 2022/0020327 | A1* | 1/2022 | Cho | G09G 3/3233 |
| 2022/0139324 | A1* | 5/2022 | Jeong | G09G 3/3275<br>345/204 |

(Continued)

FOREIGN PATENT DOCUMENTS

| | | | |
|---|---|---|---|
| KR | 10-1963595 | B1 | 4/2019 |
| KR | 10-2022-0008951 | A | 1/2022 |

(Continued)

*Primary Examiner* — Krishna P Neupane

(74) *Attorney, Agent, or Firm* — Womble Bond Dickinson (US) LLP

(57) ABSTRACT

A driving circuit includes a plurality of stages, each of the plurality of stages including: a pull-up transistor to transmit a first voltage to an output terminal; a pull-down transistor to transmit a second voltage lower than the first voltage to the output terminal; and a control transistor connected between a first terminal to receive an enable signal and a second terminal to output a selection signal, the control transistor including a gate connected to a gate of the pull-down transistor. When a voltage of the gate of the pull-down transistor is a gate-on voltage, the control transistor is to output the selection signal based on the enable signal, and the pull-down transistor is to transmit an output signal to the output terminal based on the second voltage.

23 Claims, 29 Drawing Sheets

(56) References Cited

U.S. PATENT DOCUMENTS

| | | | |
|---|---|---|---|
| 2022/0375412 | A1 | 11/2022 | Kim et al. |
| 2023/0040896 | A1 | 2/2023 | Cho et al. |
| 2023/0402013 | A1 | 12/2023 | Lim et al. |

FOREIGN PATENT DOCUMENTS

| | | | |
|---|---|---|---|
| KR | 10-2022-0068326 | A | 5/2022 |
| KR | 10-2023-0162837 | A | 11/2023 |

* cited by examiner

DRIVING CIRCUIT, DISPLAY APPARATUS, AND ELECTRONIC APPARATUS

CROSS-REFERENCE TO RELATED APPLICATION

This application claims priority to and the benefit of Korean Patent Application No. 10-2024-0098963, filed on Jul. 25, 2024, in the Korean Intellectual Property Office, the entire disclosure of which is incorporated by reference herein.

BACKGROUND

1. Field

Aspects of one or more embodiments of the present disclosure relate to a driving circuit to output a gate signal, a display apparatus including the driving circuit, and an electronic apparatus including the display apparatus.

2. Description of the Related Art

A display apparatus includes a pixel area including a plurality of pixels, a gate driving circuit, a data driving circuit, a controller, and the like. The gate driving circuit includes stages connected to gate lines, and the stages supply gate signals to the gate lines connected thereto, respectively, in response to signals from the controller.

The above information disclosed in this Background section is for enhancement of understanding of the background of the present disclosure, and therefore, it may contain information that does not constitute prior art.

SUMMARY

One or more embodiments of the present disclosure may be directed to a driving circuit of a display apparatus, in which an operating frequency may be changed in a portion of a display area, the driving circuit being capable of blocking an output of a gate signal to an area in which the driving frequency is changed, while the gate signal is output to an area in which the driving frequency is constant. One or more embodiments of the present disclosure may be directed to a display apparatus including the driving circuit, and an electronic apparatus including the display apparatus.

Additional aspects and features will be set forth, in part, in the description that follows, and in part, may be apparent from the description, or may be learned by practicing one or more of the presented embodiments of the present disclosure.

According to one or more embodiments of the present disclosure, a driving circuit includes a plurality of stages, each of the plurality of stages including: a pull-up transistor configured to transmit a first voltage to an output terminal; a pull-down transistor configured to transmit a second voltage lower than the first voltage to the output terminal; and a control transistor connected between a first terminal configured to receive an enable signal and a second terminal configured to output a selection signal, the control transistor including a gate connected to a gate of the pull-down transistor. When a voltage of the gate of the pull-down transistor is a gate-on voltage, the control transistor is configured to output the selection signal based on the enable signal, and the pull-down transistor is configured to transmit an output signal to the output terminal based on the second voltage.

In an embodiment, each of the plurality of stages may further include: a capacitor connected between a terminal configured to receive the second voltage and the second terminal; and a reset transistor connected between the terminal configured to receive the second voltage and the second terminal.

In an embodiment, when the voltage of the gate of the pull-down transistor is the gate-on voltage, a gate of the reset transistor may be configured to receive a reset signal of a gate-off voltage.

According to one or more embodiments of the present disclosure, a display apparatus includes: a first driving circuit including a plurality of first stages; a second driving circuit including a plurality of second stages; and a third driving circuit including a plurality of third stages, each of the plurality of third stages including a control transistor including a gate configured to receive a node signal from a corresponding second stage from among the plurality of second stages, the control transistor being configured to output a selection signal based on an enable signal that is input when a voltage of the gate of the control transistor is a gate-on voltage. Each of the plurality of first stages is configured to receive the selection signal from a corresponding third stage from among the plurality of third stages.

In an embodiment, each of the plurality of third stages may further include: a capacitor connected between a terminal configured to receive a second voltage and a second terminal; and a reset transistor connected between the terminal configured to receive the second voltage and the second terminal.

In an embodiment, when a voltage of a gate of a pull-down transistor is the gate-on voltage, a gate of the reset transistor may be configured to receive a reset signal of a gate-off voltage.

In an embodiment, some of consecutive third stages from among the plurality of third stages may be configured to output selection signals of a low level, others of the consecutive third stages from among the plurality of third stages may be configured to output selection signals of a high level, and lengths of high-level periods of the selection signals output by the others of the consecutive third stages are different from each other.

In an embodiment, first stages configured to receive the selection signals of the low level from among the plurality of first stages may be configured to output first gate signals of the gate-on voltage, and first stages configured to receive the selection signals of the high level from among the plurality of first stages may be configured to output the first gate signals of a gate-off voltage.

In an embodiment, in a mode in which the display apparatus displays images with different driving frequencies for each area, the first stages from among the first stages, the second stages from among the second stages, and the third stages from among the third stages, which correspond to a first area configured to display an image with a driving frequency lower than a normal driving frequency, may be determined. When the node signal of a first second stage from among the second stages corresponding to the first area is the gate-on voltage of the control transistor, an enable signal of a high level may be input to the third driving circuit. The third stages corresponding to the first area may be configured to output selection signals of the high level, the first stages corresponding to the first area may be configured to output first gate signals of a gate-off voltage, and a starting point of the high level of the selection signals output by the third stages corresponding to the first area may match a starting point of the high level of the enable signal.

In an embodiment, third stages from among the third stages corresponding to a second area configured to display an image with the normal driving frequency may be configured to output selection signals of a low level, and first stages from among the first stages corresponding to the second area may be configured to sequentially output first gate signals of the gate-on voltage.

In an embodiment, the second stages corresponding to the first area may be configured to sequentially output second gate signals of the gate-off voltage, while the first stages corresponding to the first area may be configured to output first gate signals of the gate-off voltage. Second stages from among the second stages corresponding to the second area may be configured to output the second gate signals of the gate-off voltage, while the first stages corresponding to the second area may be configured to output the first gate signals of the gate-on voltage.

In an embodiment, each of a plurality of pixels in the first area and the second area may include: a driving transistor; a first transistor configured to be turned on by one of the first gate signals of the gate-on voltage to transmit a data signal to the driving transistor; and a second transistor configured to be turned on by one of the second gate signals of the gate-on voltage to transmit a driving current corresponding to the data signal to a light-emitting element. A number of times the pixels in the first area receive the first gate signals of the gate-on voltage per second may be less than a number of times the pixels in the second area receive the first gate signals of the gate-on voltage per second.

In an embodiment, a number of times the pixels in the first area receive the second gate signals of the gate-off voltage per second may be the same as a number of times the pixels in the second area receive the second gate signals of the gate-off voltage per second.

In an embodiment, the display apparatus may further include a fourth driving circuit including a plurality of fourth stages. Each of the plurality of fourth stages may be configured to receive the selection signal from a corresponding third stage from among the plurality of third stages. Each of the pixels in the first area and the second area may further include a third transistor configured to be turned on by a third gate signal of the gate-on voltage to compensate for a threshold voltage of the driving transistor. A number of times the pixels in the first area receive the third gate signal of the gate-on voltage from the fourth driving circuit per second may be less than a number of times the pixels in the second area receive the third gate signal of the gate-on voltage from the fourth driving circuit per second.

In an embodiment, each of the plurality of second stages may include: a pull-up transistor configured to transmit a first voltage to an output terminal; and a pull-down transistor configured to transmit a second voltage lower than the first voltage to the output terminal. The node signal may include a voltage that is input to a gate of the pull-down transistor of each of the plurality of second stages.

In an embodiment, each of the plurality of first stages may include: a pull-up transistor configured to transmit a first voltage to an output terminal; a pull-down transistor configured to transmit a second voltage lower than the first voltage to the output terminal; and a first masking transistor connected to a gate of the pull-down transistor, and including a gate configured to receive the selection signal.

In an embodiment, in a mode in which the display apparatus is configured to display images with different driving frequencies for each area, the selection signal may be a gate-off voltage of the first masking transistor.

In an embodiment, each of the plurality of first stages may further include a second masking transistor connected to a gate of the pull-up transistor, the second masking transistor including a gate configured to receive the selection signal.

According to one or more embodiments of the present disclosure, a driving circuit includes a plurality of stages, each of the plurality of stages including: a pull-up transistor configured to transmit a first voltage to an output terminal; a pull-down transistor configured to transmit a second voltage lower than the first voltage to the output terminal; and a first masking transistor connected between a first node configured to receive a voltage level of a start signal and a gate of the pull-down transistor, the first masking transistor including a gate configured to receive a selection signal. In a mode in which the display apparatus is configured to display images with different driving frequencies for each area, the selection signal is a gate-off voltage of the first masking transistor.

In an embodiment, each of the plurality of stages may further include a second masking transistor connected between a second node configured to receive a voltage level opposite to the voltage level of the start signal and the gate of the pull-up transistor, the second masking transistor including a gate configured to receive the selection signal.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
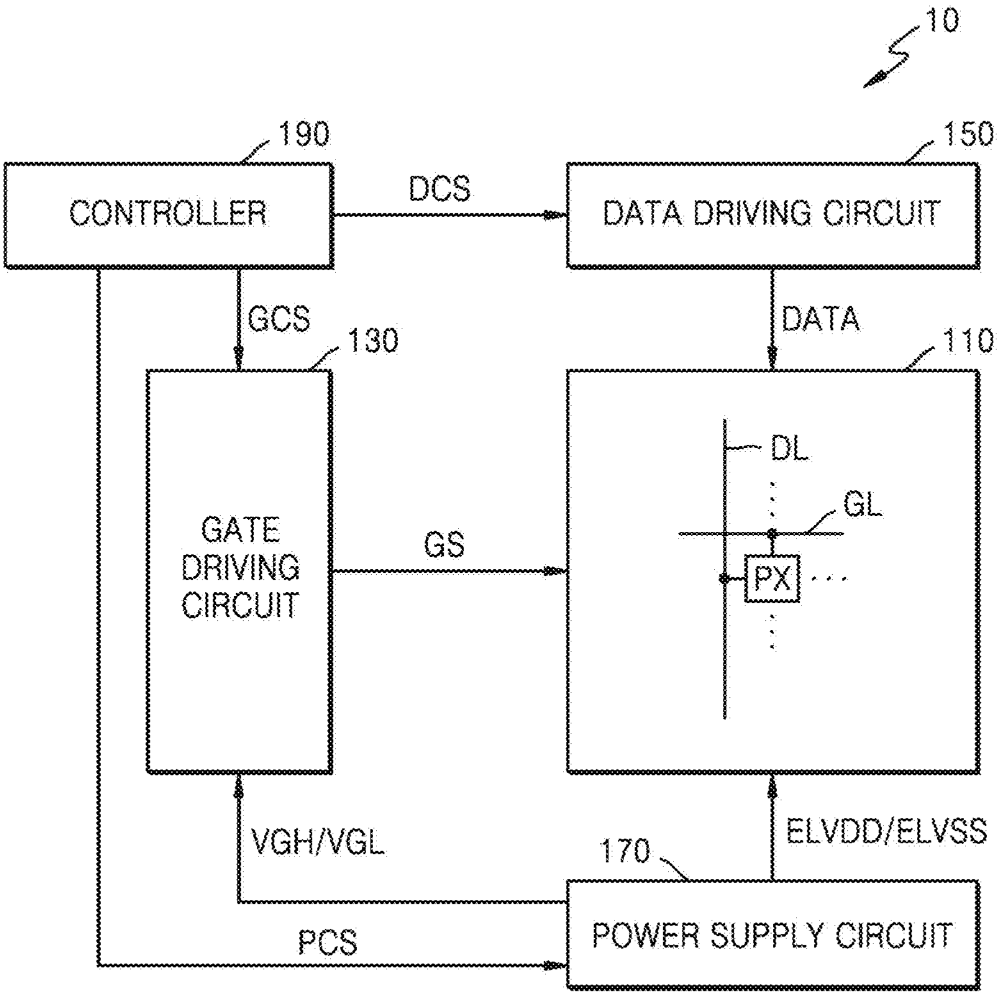
FIG. 1 is a block diagram schematically illustrating a display apparatus according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms “a” and “an” are intended to include the plural forms as well, unless the context clearly indicates otherwise. It will be further understood that the terms “comprises,” “comprising,” “includes,” “including,” “has,” “have,” and “having,” when used in this specification, specify the presence of the stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. For example, the expression “A and/or B” denotes A, B, or A and B. Expressions such as “at least one of,” when preceding a list of elements, modify the entire list of elements and do not modify the individual elements of the list. For example, the expression “at least one of a, b, or c,” “at least one of a, b, and c,” and “at least one selected from the group consisting of a, b, and c” indicates only a, only b, only c, both a and b, both a and c, both b and c, all of a, b, and c, or variations thereof.

As used herein, the term “substantially,” “about,” and similar terms are used as terms of approximation and not as terms of degree, and are intended to account for the inherent variations in measured or calculated values that would be recognized by those of ordinary skill in the art. Further, the use of “may” when describing embodiments of the present disclosure refers to “one or more embodiments of the present disclosure.” As used herein, the terms “use,” “using,” and “used” may be considered synonymous with the terms “utilize,” “utilizing,” and “utilized,” respectively.

Hereinafter, the term “on” as used in association with a device state may refer to an activated state of the device, and the term “off” may refer to a deactivated state of the device. The term “on” as used in association with a signal received by a device may refer to a signal having a level activating the device, and the term “off” may refer to a signal having a level deactivating the device. A device may be activated by a voltage of a high level or a low level. For example, a P-channel transistor (e.g., a P-type transistor) may be activated by a low-level voltage, and an N-channel transistor (e.g., an N-type transistor) may be activated by a high-level voltage. Accordingly, it should be understood that “on” voltages for the P-channel transistor and the N-channel transistor are opposite voltage levels to each other (e.g., low versus high). As such, hereinafter, a voltage that activates (e.g., turns on) a transistor will be referred to as a gate-on voltage, and a voltage that deactivates (e.g., turns off) a transistor will be referred to as a gate-off voltage.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
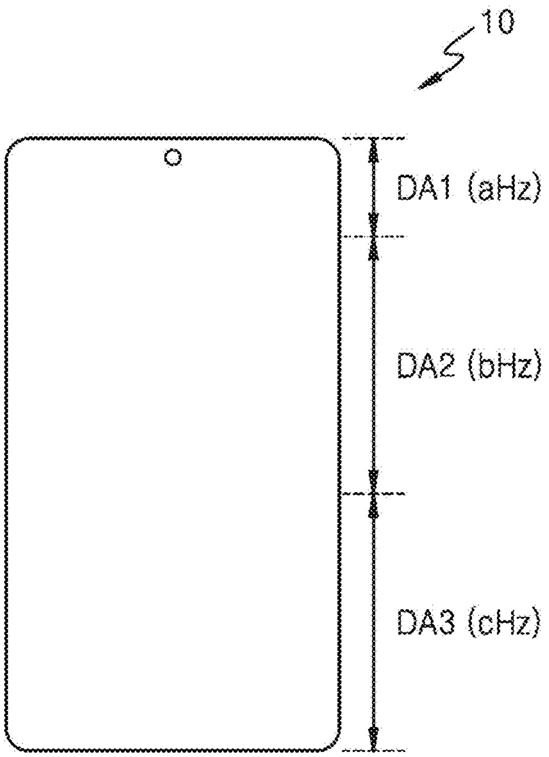
FIGS. 2 and 3 are diagrams illustrating a driving frequency for each area of a display apparatus according to an embodiment.
Figure 3:
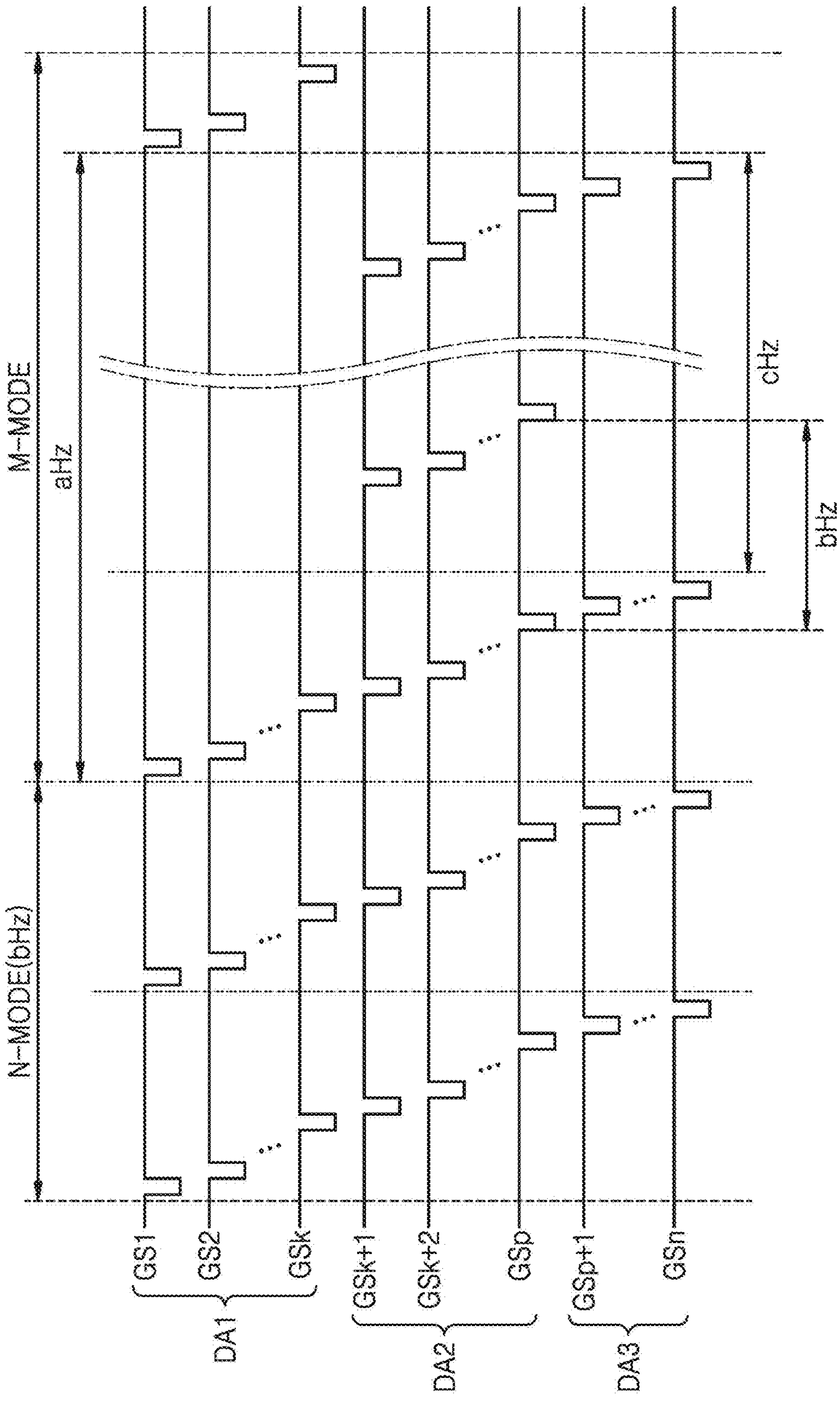

FIG. 1 is a block diagram schematically illustrating a display apparatus 10 according to an embodiment. FIGS. 2 and 3 are diagrams illustrating a driving frequency for each area of the display apparatus 10 according to an embodiment.

Referring to FIG. 1, the display apparatus 10 may include a pixel area 110, a gate driving circuit 130, a data driving circuit 150, a power supply circuit 170, and a controller 190.

The pixel area 110 may correspond to a display area in which an image is displayed. Various conductive lines to transmit an electrical signal to be applied to the display area, outer driving circuits electrically connected to pixel circuits, and pads to which a printed circuit board or a driver integrated circuit (IC) chip is attached may be in a peripheral area (e.g., a non-display area) outside the display area. For example, the gate driving circuit 130, the data driving circuit 150, the power supply circuit 170, and the controller 190 may be provided in the peripheral area.

A plurality of gate lines GL, a plurality of data lines DL, and a plurality of pixels PX connected to the gate lines GL and the data lines DL may be arranged in the pixel area 110. The plurality of pixels PX may be repeatedly arranged along a first direction (e.g., the x-axis direction or a row direction) and a second direction (e.g., the y-axis direction or a column direction). The plurality of pixels PX may be arranged in various suitable forms, such as a stripe arrangement, a diamond arrangement (e.g., a PENTILE arrangement, PENTILE being a duly registered trademark of Samsung Display Co., Ltd.), and/or a mosaic arrangement, to realize an image. The plurality of pixels PX may each include an organic light-emitting diode (OLED) as a display element, and the organic light-emitting diode may be connected to the pixel circuit. The pixel circuit may include a plurality of transistors, and at least one capacitor. The pixel PX may emit, for example, red, green, blue, or white light through the organic light-emitting diode. Each pixel PX may be connected to a corresponding gate line from among the plurality of gate lines GL, and a corresponding data line from among the plurality of data lines DL.

According to an embodiment, the plurality of transistors included in the pixel circuit may be P-channel silicon transistors. According to an embodiment, the plurality of transistors included in the pixel circuit may be N-channel oxide transistors. According to an embodiment, some of the plurality of transistors included in the pixel circuit may be P-channel silicon transistors, and others may be N-channel oxide transistors.

The gate lines GL may each extend in the x-axis direction (e.g., the row direction), and may be connected to the pixels PX located in the same row as each other. The gate lines GL may each transmit a gate signal to the pixels PX in the same row as each other. The data lines DL may each extend in the y-axis direction (e.g., the column direction), and may be connected to the pixels PX located in the same column as each other. The data lines DL may each transmit a data signal to each of the pixels PX in the same column as each other, in synchronization with the gate signal.

The gate driving circuit 130 may be connected to the plurality of gate lines GL, and may generate a gate signal GS in response to a gate driving control signal GCS from the controller 190. The gate driving circuit 130 may sequentially supply the gate signal GS to the gate lines GL. The gate line GL may be connected to a gate of a transistor included in the pixel PX, and the gate signal GS may be a gate control signal for controlling the turning on or turning off of the transistor to which the gate line GL is connected. The gate signal GS may include a gate-on voltage for turning the transistor on, and a gate-off voltage for turning the transistor off. The gate driving circuit 130 may include a plurality of stages to generate and output the gate signal GS sequentially.

The data driving circuit 150 may be connected to the plurality of data lines DL, and may supply a data signal DATA to the data lines DL, in response to a data driving control signal DCS from the controller 190. The data signal DATA supplied to the data lines DL may be supplied to the pixels PX to which the gate signal GS has been supplied. The data driving circuit 150 may convert input image data having a grayscale (e.g., a grayscale value or level) input from the controller 190 into the data signal DATA in the form of a voltage or a current.

The power supply circuit 170 may generate signals (e.g., voltages and currents) used to drive the pixels PX of the pixel area 110, in response to a power driving control signal PCS from the controller 190. When the display apparatus 10 is an organic light-emitting display apparatus, the power supply circuit 170 may generate a first power voltage ELVDD and a second power voltage ELVSS, and may supply the first power voltage ELVDD and the second power voltage ELVSS to the pixels PX. The first power voltage ELVDD may be a high-level voltage provided to one terminal of a driving transistor connected to a first electrode (e.g., a pixel electrode or an anode) of an organic light-emitting diode of each pixel PX. The second power voltage ELVSS may be a low-level voltage provided to a second electrode (e.g., an opposite electrode or a cathode) of the organic light-emitting diode. The first power voltage ELVDD and the second power voltage ELVSS may be driving voltages used for emitting light by the plurality of pixels PX.

The power supply circuit 170 may generate a first voltage VGH and a second voltage VGL, and may supply the same to the gate driving circuit 130.

The controller 190 may generate the gate driving control signal GCS, the data driving control signal DCS, and the power driving control signal PCS, based on signals input from an external source. The controller 190 may supply the gate driving control signal GCS to the gate driving circuit 130, the data driving control signal DCS to the data driving circuit 150, and the power driving control signal PCS to the power supply circuit 170. According to an embodiment, the power supply circuit 170 or the controller 190 may generate a plurality of clock signals CLK and external signals EM_FLM, GI_FLM, GW_FLM and GB_FLM, enable signal EN, and the like (e.g., see FIGS. 8A and 8B), and may supply the same to the gate driving circuit 130.

The display apparatus 10 illustrated in FIG. 1 includes the power supply circuit 170 and the controller 190 independently from each other, but the present disclosure is not limited thereto. According to an embodiment, the power supply circuit 170 may be included in the controller 190.

The display apparatus 10 may include a display panel, and the display panel may include a substrate. The pixels PX may be arranged in the display area of the substrate. A portion or all of the gate driving circuit 130 may be directly formed in the peripheral area of the substrate, during a process of forming the transistor of the pixel circuit in the display area of the substrate. The data driving circuit 150, the power supply circuit 170, and the controller 190 may be formed in the form of individual integrated circuit (IC) chips, or together in one IC chip, and may be arranged on a flexible printed circuit board (FPCB) electrically connected to a pad provided at one side of the substrate. According to another embodiment, the data driving circuit 150, the power supply circuit 170, and the controller 190 may be directly arranged on the substrate in a chip-on-glass (COG) manner or a chip-on-plastic (COP) manner.

Referring to FIG. 2, the display apparatus 10 may display an image in a first driving mode or a second driving mode. The first driving mode may be a normal driving mode, and the second driving mode may be a multi-frequency driving (MFD) mode. In the first driving mode, the display apparatus 10 may display an image in the entire display area with one driving frequency. In the second driving mode, the display apparatus 10 may display an image in a plurality of areas obtained by splitting the display area with different driving frequencies. For example, the display apparatus 10 may display an image in a first area DA1 with an aHz (e.g., 10 Hz), an image in a second area DA2 with a bHz (e.g., 120 Hz), and an image in a third area DA3 with a cHz (e.g., 30 Hz).

As shown in FIG. 3, in a first driving mode N-MODE, the gate driving circuit 130 may output the gate signal GS sequentially to the first area DA1, the second area DA2, and the third area DA3, according to the driving frequency of the bHz.

In a second driving mode M-MODE, the gate driving circuit 130 may control an output of the gate signal GS for each area according to a driving frequency for each area. In the second driving mode M-MODE, the gate driving circuit 130 may not output the gate signal GS in at least one area according to the driving frequency for each area.

The gate driving circuit 130 may sequentially output gate signals (e.g., a first gate signal GS1 to a (k)th gate signal GSk) to the first area DA1 (e.g., a first row to a (k)th row) according to the driving frequency of the aHz, may sequentially output gate signals (e.g., a (k+1)th gate signal GSk+1 to a (p)th gate signal GSp) to the second area DA2 (e.g., a (k+1)th row to a (p)th row) according to the driving frequency of the bHz, and may sequentially output gate signals (e.g., a (p+1)th gate signal GSp+1 to an (n)th gate signal GSn) to the third area DA3 (e.g., a (p+1)th row to an (n)th row) with the driving frequency of the cHz. Here, n is an integer greater than or equal to 1, and p and k each are an integer greater than or equal to 1 and less than or equal to n. For example, the gate driving circuit 130 may sequentially output the gate signal GS to the first area DA1 10 times per second, may sequentially output the gate signal GS to the second area DA2 120 times per second, and may sequentially output the gate signal GS to the third area DA3 30 times per second.

Figure 4:
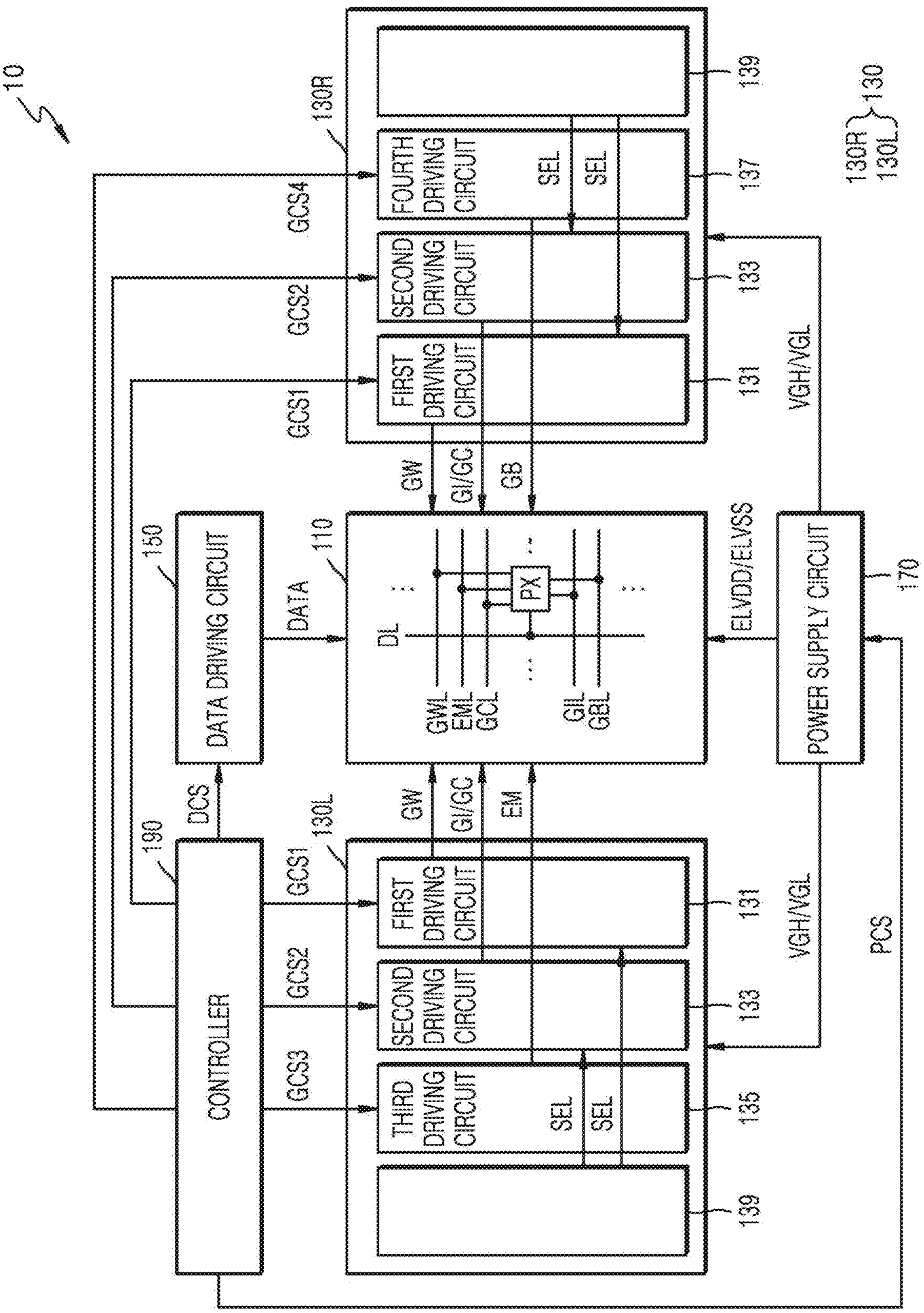
FIG. 4 is a block diagram schematically illustrating a display apparatus according to an embodiment.

FIG. 4 is a block diagram schematically illustrating the display apparatus 10 according to an embodiment. Hereinafter, redundant description of the components that are the same or substantially the same as those of the display apparatus 10 described above with reference to FIG. 1 may not be repeated.

Referring to FIG. 4, the display apparatus 10 may include a first gate driving circuit 130L arranged on the left side of the pixel area 110, and a second gate driving circuit 130R arranged on the right side of the pixel area 110. The first gate driving circuit 130L may include a first driving circuit 131, a second driving circuit 133, a third driving circuit 135, and a masking driving circuit 139. The second gate driving circuit 130R may include the first driving circuit 131, the second driving circuit 133, a fourth driving circuit 137, and the masking driving circuit 139.

The first driving circuit 131 may be connected to a plurality of first gate lines GWL, and may supply a first gate signal GW sequentially to the first gate lines GWL according to a first control signal GCS1. The second driving circuit 133 may be connected to a plurality of second gate lines GIL, and may supply a second gate signal GI sequentially to the second gate lines GIL according to a second control signal GCS2. The second driving circuit 133 may be connected to a plurality of third gate lines GCL, and may supply a third gate signal GC sequentially to the third gate lines GCL according to the second control signal GCS2. The third driving circuit 135 may be connected to a plurality of fourth gate lines EML, and may supply a fourth gate signal EM sequentially to the fourth gate lines EML according to a third control signal GCS3. The fourth driving circuit 137 may be connected to a plurality of fifth gate lines GBL, and may supply a fifth gate signal GB sequentially to the fifth gate lines GBL according to a fourth control signal GCS4.

The masking driving circuit 139 may be connected to the third driving circuit 135 to receive a signal from the third driving circuit 135, and may output a selection signal SEL to at least one of the first driving circuit 131, the second driving circuit 133, or the fourth driving circuit 137. The first driving circuit 131, the second driving circuit 133, and the fourth driving circuit 137 may or may not output a gate signal in response to the selection signal SEL. An example in which the masking driving circuit 139 outputs the selection signal SEL to the first driving circuit 131 and the second driving circuit 133 will be described in more detail hereinafter.

Figure 5:
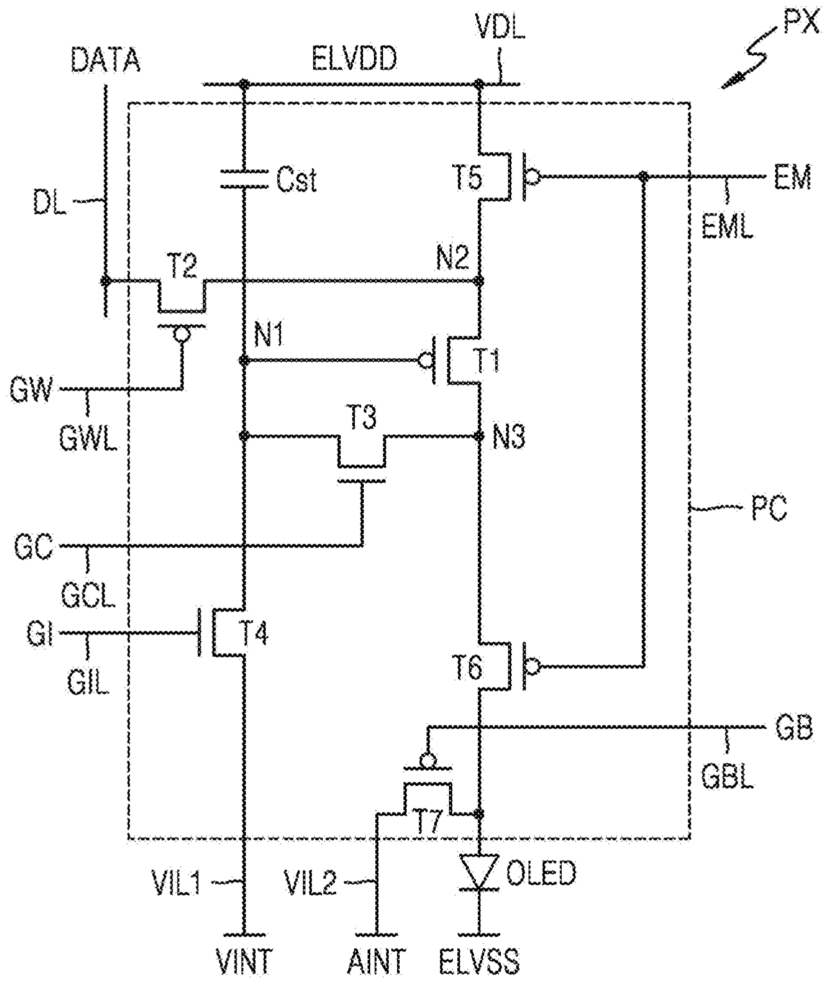
FIG. 5 is an equivalent circuit diagram of a pixel according to an embodiment.
Figure 6:
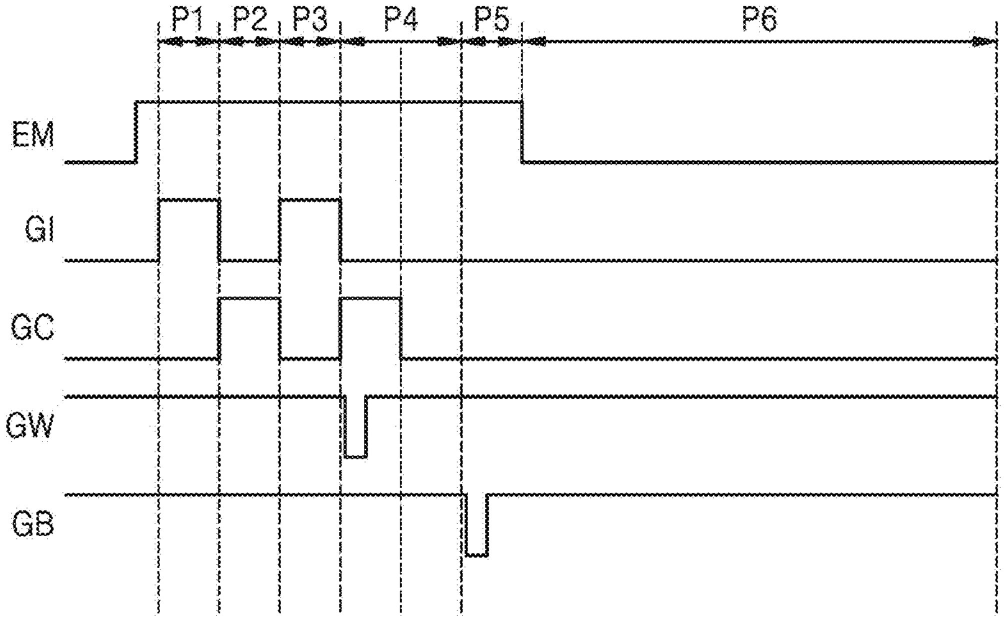
FIG. 6 is a signaling diagram illustrating operations of a pixel according to an embodiment.

FIG. 5 is an equivalent circuit diagram of the pixel PX according to an embodiment. FIG. 6 is a signaling diagram illustrating operations of the pixel PX according to an embodiment.

Referring to FIG. 5, the pixel PX includes a pixel circuit PC, and an organic light-emitting diode OLED as a display element connected to the pixel circuit PC. The pixel circuit PC may include first to seventh transistors T1 to T7, a capacitor Cst, and signal lines connected thereto. The signal lines may include the data line DL, the first gate line GWL, the second gate line GIL, the third gate line GCL, the fourth gate line EML, the fifth gate line GBL, a driving voltage line VDL, a first initialization voltage line VIL1, and a second initialization voltage line VIL2.

The first transistor T1 may be a driving transistor in which a source-drain current is determined according to a gate-source voltage thereof. The second to seventh transistors T2 to T7 may be switching transistors that are turned on/off according to the gate-source voltage thereof, or substantially, a gate voltage thereof. A first terminal of each of the first to seventh transistors T1 to T7 may be a source or a drain, and a second terminal thereof may be a terminal different from the first terminal, depending on a transistor type (e.g., a P-type or an N-type) and/or an operating condition. For example, when the first terminal is a source, the second terminal may be a drain.

The first transistor T1, the second transistor T2, the fifth transistor T5, the sixth transistor T6, and the seventh transistor T7 may be P-channel transistors. The third transistor T3 and the fourth transistor T4 may be N-channel transistors.

The first transistor T1 may be connected between the driving voltage line VDL and the organic light-emitting diode OLED. The first transistor T1 may be connected to the driving voltage line VDL through the fifth transistor T5, and may be connected to the organic light-emitting diode OLED through the sixth transistor T6. The first transistor T1 includes a gate connected to a first node N1, the first terminal connected to a second node N2, and the second terminal connected to a third node N3. The first transistor T1 may supply, to the organic light-emitting diode OLED, the driving current corresponding to a voltage applied to the first node N1, according to a switching operation of the second transistor T2.

The second transistor T2 may be connected between the data line DL and the second node N2. The second transistor T2 may include a gate connected to the first gate line GWL, the first terminal connected to the data line DL, and the second terminal connected to the second node N2. The second transistor T2 may be turned on according to the first gate signal GW received through the first gate line GWL, and may transmit the data signal DATA to the second node N2 through the data line DL.

The third transistor T3 may be connected between the first node N1 and the third node N3. The third transistor T3 may include a gate connected to the third gate line GCL, the first terminal connected to the third node N3, and the second terminal connected to the first node N1. When the third transistor T3 is turned on according to the third gate signal GC received through the third gate line GCL, the first transistor T1 is diode-connected and a threshold voltage of the first transistor T1 may be compensated for.

The fourth transistor T4 may be connected between the first node N1 and the first initialization voltage line VIL1. The fourth transistor T4 may include a gate connected to the second gate line GIL, the first terminal connected to the first node N1, and the second terminal connected to the first initialization voltage line VIL1. The fourth transistor T4 may be turned on according to the second gate signal GI received through the second gate line GIL to transmit a first initialization voltage VINT to the first node N1, thereby initializing the first node N1 (e.g., the gate of the first transistor T1).

The fifth transistor T5 may be connected between the driving voltage line VDL and the second node N2. The fifth transistor T5 may include a gate connected to the fourth gate line EML, the first terminal connected to the driving voltage line VDL, and the second terminal connected to the second node N2. The sixth transistor T6 may include a gate connected to the fourth gate line EML, the first terminal connected to the third node N3, and the second terminal connected to a pixel electrode of the organic light-emitting diode OLED. When the fifth transistor T5 and the sixth transistor T6 are concurrently or substantially simultaneously turned on with each other according to the fourth gate signal EM received through the fourth gate line EML, a driving current may flow through the organic light-emitting diode OLED.

The seventh transistor T7 may be connected between the organic light-emitting diode OLED and the second initialization voltage line VIL2. The seventh transistor T7 may include a gate connected to the fifth gate line GBL, the first terminal connected to the pixel electrode of the organic light-emitting diode OLED, and the second terminal connected to the second initialization voltage line VIL2. The seventh transistor T7 may be turned on according to the fifth gate signal GB received through the fifth gate line GBL, to initialize the pixel electrode of the organic light-emitting diode OLED by transmitting a second initialization voltage AINT to the pixel electrode of the organic light-emitting diode OLED.

The capacitor Cst may be connected between the driving voltage line VDL and the first node N1. The capacitor Cst may store a voltage corresponding to a voltage difference between the driving voltage line VDL and the first node N1.

The organic light-emitting diode OLED may include the pixel electrode (e.g. an anode), and an opposite electrode (e.g., a cathode) opposite to or facing the pixel electrode.

The opposite electrode may receive the second power voltage ELVSS. The organic light-emitting diode OLED may emit light of a desired color (e.g., a certain or predetermined color) by receiving a driving current corresponding to the data signal DATA from the first transistor T1.

Referring to FIG. 6, a period in which the fourth gate signal EM is a gate-off voltage (e.g., a high-level voltage) may be a non-emission period of the pixel, and a period in which the fourth gate signal EM is a gate-on voltage (e.g., a low-level voltage) may be an emission period of the pixel. The non-emission period may include at least one initialization period and at least one compensation period.

A first period P1 and a third period P3 may be the initialization period in which the first node N1 connected to the gate of the first transistor T1 is initialized. The second gate signal GI of the gate-on voltage (e.g., the high-level voltage) may be supplied to the second gate line GIL during the first period P1 and the third period P3. The fourth transistor T4 may be turned on by the second gate signal GI, and the gate of the first transistor T1 may be initialized to the first initialization voltage VINT.

A second period P2 and a fourth period P4 may be the compensation period in which the threshold voltage of the first transistor T1 is compensated for. The third gate signal GC of the gate-on voltage (e.g., the high-level voltage) may be supplied to the third gate line GCL during the second period P2 and the fourth period P4.

A data signal may be applied to the pixel PX during the fourth period P4. The first gate signal GW of the gate-on voltage may be supplied to the first gate line GWL during the fourth period P4. The second transistor T2 is turned on by the first gate signal GW. The turned-on second transistor T2 may transmit, to the second node N2, the data signal DATA supplied from the data line DL. Because the third transistor T3 is turned on by the third gate signal GC and the first transistor T1 is diode-connected, the threshold voltage of the first transistor T1 and a data voltage corresponding to the data signal DATA may be stored in the capacitor Cst. Accordingly, the threshold voltage of the first transistor T1 may be compensated for, and the data voltage may be charged in the pixel PX.

During a fifth period P5, the fifth gate signal GB of the gate-on voltage (e.g., the low-level voltage) may be supplied to the fifth gate line GBL. The seventh transistor T7 may be turned on by the fifth gate signal GB. The pixel electrode of the organic light-emitting diode OLED may be initialized to the second initialization voltage AINT by the turned-on seventh transistor T7.

A sixth period P6 may be a period in which the organic light-emitting diode OLED emits light. The fourth gate signal EM of the gate-on voltage (e.g., the low-level voltage) may be supplied to the fourth gate line EML during the sixth period P6. The fifth transistor T5 and the sixth transistor T6 may be turned on by the fourth gate signal EM. A current path from the driving voltage line VDL to the organic light-emitting diode OLED may be formed by the turned-on fifth transistor T5 and sixth transistor T6. The first transistor T1 may output a driving current corresponding to the data voltage, and the organic light-emitting diode OLED may emit light having a luminance corresponding to the driving current.

Figure 7:
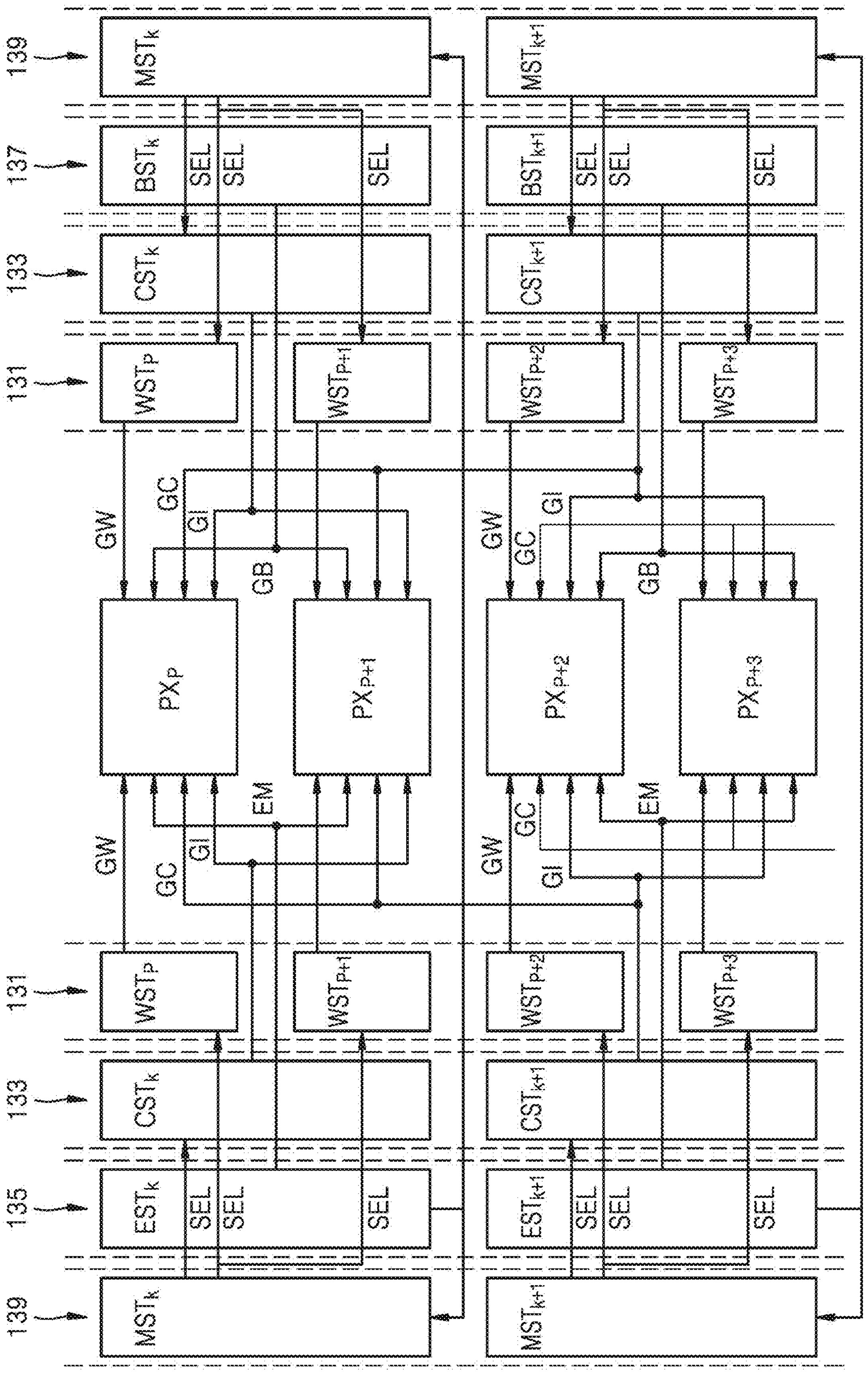
FIG. 7 is a block diagram schematically illustrating a portion of a gate driving circuit according to an embodiment.

FIG. 7 is a block diagram schematically showing a portion of a gate driving circuit according to an embodiment.

Referring to FIG. 7, the first driving circuit 131, the second driving circuit 133, the third driving circuit 135, the fourth driving circuit 137, and the masking driving circuit 139 may each include a plurality of stages. The masking driving circuit 139 may be connected to the third driving circuit 135, may generate the selection signal SEL, and may output the selection signal SEL to the first driving circuit 131 and the second driving circuit 133.

The first driving circuit 131 may include a plurality of stages . . . , WSTp, WSTp+1, WSTp+2, WSTp+3, . . . sequentially connected to each other. The plurality of stages . . . , WSTp, WSTp+1, WSTp+2, WSTp+3, . . . may respectively correspond to the rows of the pixel area 110. Each of the plurality of stages . . . , WSTp, WSTp+1, WSTp+2, WSTp+3, . . . may generate the first gate signal GW, and may output the first gate signal GW to the first gate line GWL of a corresponding row.

The second driving circuit 133 may include a plurality of stages . . . , CSTk, CSTk+1, . . . sequentially connected to each other. The plurality of stages . . . , CSTk, CSTk+1, . . . may each correspond to two rows (e.g., a pair of rows) of the pixel area 110. Each of the plurality of stages . . . , CSTK, CSTK+1, . . . may generate the second gate signal GI, and may output the second gate signal GI to the second gate lines GIL of corresponding two rows. Also, each of the plurality of stages . . . , CSTK, CSTK+1, . . . may output, as the third gate signal GC, the second gate signal GI to the third gate lines GCL of previous two rows.

The third driving circuit 135 may include a plurality of stages . . . , ESTk, ESTk+1, . . . sequentially connected to each other. The plurality of stages . . . , ESTk, ESTk+1, . . . may each correspond to two rows (e.g., a pair of rows) of the pixel area 110. Each of the plurality of stages . . . , ESTk, ESTk+1, . . . may generate the fourth gate signal EM, and may output the fourth gate signal EM to two fourth gate lines EML respectively arranged in two corresponding rows.

The fourth driving circuit 137 may include a plurality of stages . . . , BSTk, BSTk+1, . . . sequentially connected to each other. The plurality of stages . . . , BSTk, BSTK+1, . . . may each correspond to two rows (e.g., a pair of rows) of the pixel area 110. Each of the plurality of stages . . . , BSTk, BSTk+1, . . . may generate the fifth gate signal GB, and output the fifth gate signal GB to two fifth gate lines GBL respectively arranged in two corresponding rows.

The masking driving circuit 139 may include a plurality of stages . . . , MSTk, MSTk+1, . . . sequentially connected to each other. The plurality of stages . . . , MSTk, MSTk+1, . . . may each correspond to two rows (e.g., a pair of rows) of the pixel area 110. According to an embodiment, the plurality of stages . . . , MSTk, MSTk+1, . . . may receive node signals from the plurality of stages . . . , ESTk, ESTk+1, . . . of the third driving circuit 135, respectively, may generate the selection signals SEL, and may output the selection signals SEL to a corresponding pair from among the plurality of stages . . . , WSTp, WSTp+1, WSTp+2, WSTp+3, . . . of the first driving circuit 131 and a corresponding one from among the plurality of stages . . . , CSTK, CSTK+1, . . . of the second driving circuit 133.

Figure 8A:
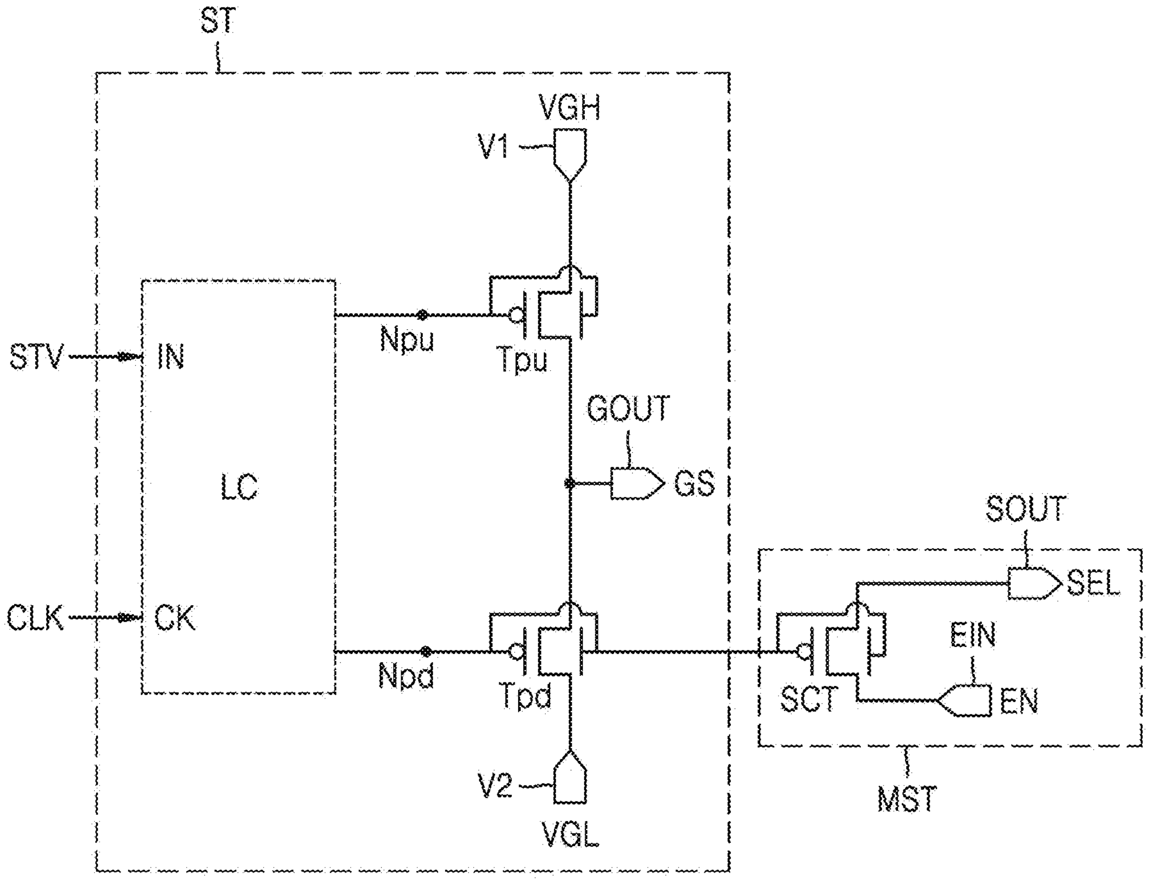
FIGS. 8A and 8B are circuit diagrams schematically illustrating a stage of a masking driving circuit according to one or more embodiments.
Figure 8B:
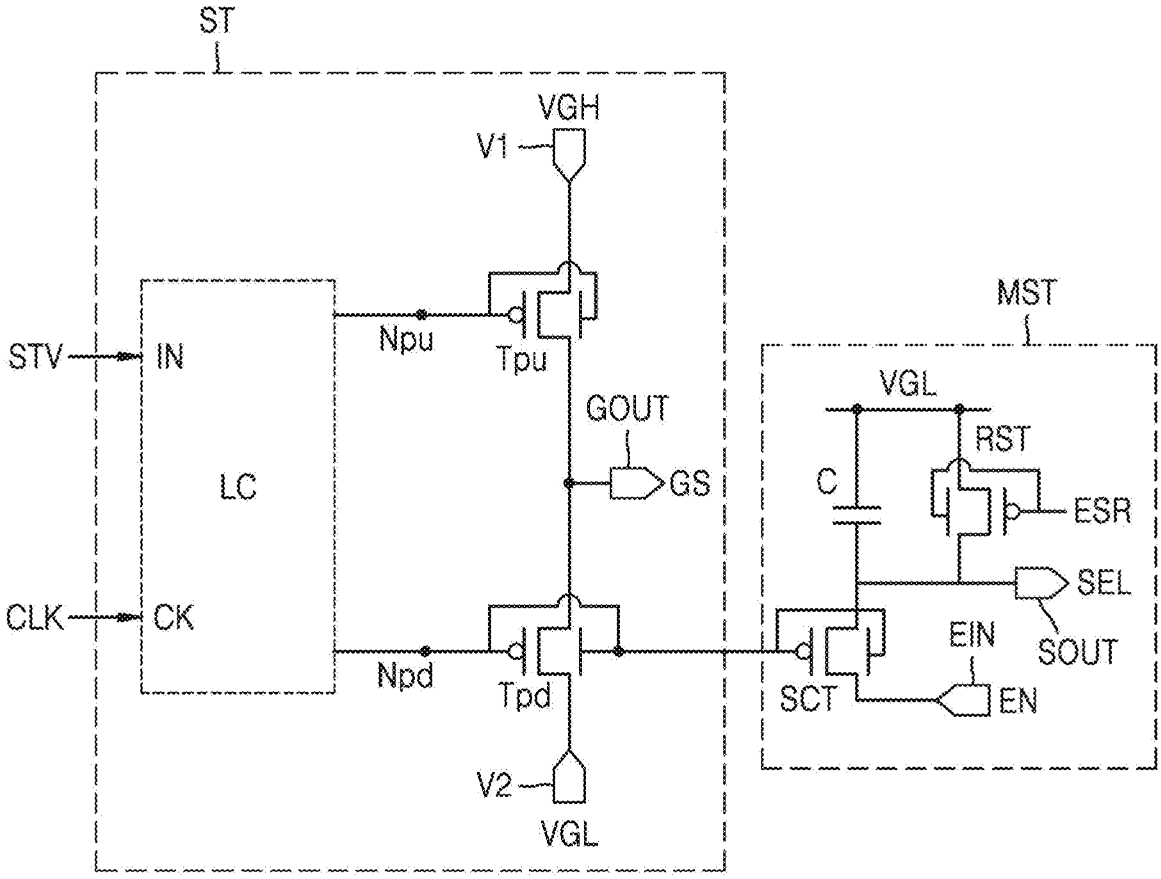
Figure 9:
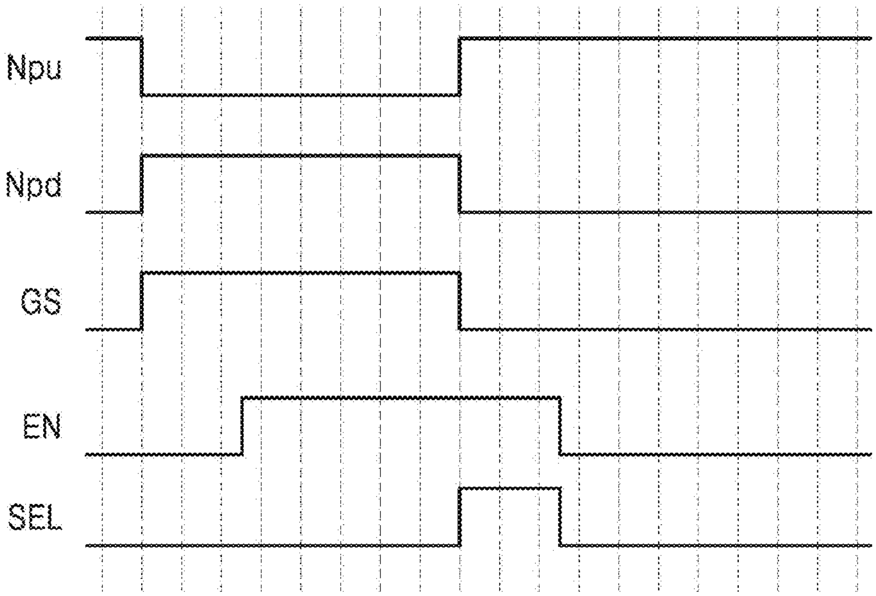
FIG. 9 is a signaling diagram showing signals illustrating operations of a masking driving circuit according to an embodiment.

FIGS. 8A and 8B are circuit diagrams schematically illustrating a stage MST of a masking driving circuit according to one or more embodiments. FIG. 9 is a signaling diagram showing signals illustrating operations of a masking driving circuit according to an embodiment.

Referring to FIG. 8A, the stage MST of the masking driving circuit may include a control transistor SCT. The control transistor SCT may be connected between a terminal EIN to which an enable signal EN is input and an output terminal SOUT from which the selection signal SEL is output. A gate of the control transistor SCT may be connected to one node of a corresponding stage. For example, the gate of the control transistor SCT may be connected to a pull-down node Npd of a corresponding stage ST. According to an embodiment, the control transistor SCT may be a dual-gate transistor further including a back gate that receives a same signal as that of the gate thereof.

According to an embodiment, as shown in FIG. 8B, the stage MST of the masking driving circuit may further include a reset transistor RST and a capacitor C.

The reset transistor RST may be connected between a terminal to which the second voltage VGL is input and the output terminal SOUT. A gate of the reset transistor RST may be connected to a terminal to which a reset signal ESR is input. When the reset signal ESR is input at a low level, the reset transistor RST is turned on, and the second voltage VGL may be output from the output terminal SOUT by the turned-on reset transistor RST. The reset signal ESR may be input at the low level when a voltage of the pull-down node Npd is at a high level and the control transistor SCT is turned off, and may be input at a high level when the voltage of the pull-down node Npd is a low level and the control transistor SCT is turned on. According to an embodiment, the reset transistor RST may be a dual-gate transistor further including a back gate that receives a same signal as that of the gate thereof.

The capacitor C may be connected between the terminal to which the second voltage VGL is input and the output terminal SOUT. The capacitor C may maintain or substantially maintain a voltage of the output terminal SOUT.

During a power-on operation of the display apparatus 10, the controller 190 may control the reset signal ESR to be at a low level, may control a voltage of a pull-up node Npu to be at a high level, and may control the voltage of the pull-down node Npd and the selection signal SEL to be at a low level.

The corresponding stage ST may include a pull-up transistor Tpu, a pull-down transistor Tpd, and a control circuit LC. The pull-up transistor Tpu may be connected between a first voltage input terminal V1 to which the first voltage VGH is input and an output terminal GOUT. The pull-down transistor Tpd may be connected between the output terminal GOUT and a second voltage input terminal V2 to which the second voltage VGL is input. The control circuit LC may control a voltage of the pull-up node Npu connected to a gate of the pull-up transistor Tpu, and a voltage of the pull-down node Npd connected to a gate of the pull-down transistor Tpd. The control circuit LC may receive a start signal STV through an input terminal IN, and may receive a clock signal CLK through a clock terminal CK.

According to an embodiment, the pull-up transistor Tpu and the pull-down transistor Tpd may each be a dual-gate transistor further including a back gate that receives a same signal as that of the gate thereof. A voltage level of the voltage of the pull-up node Npu and a voltage level of the voltage of the pull-down node Npd may be opposite to each other. The voltage level of the voltage of the pull-down node Npd may be the same as that of an output signal of the corresponding stage ST (e.g., the voltage level of the gate signal GS).

The control transistor SCT may be turned on when the voltage of the pull-down node Npd of the corresponding stage ST is at a low level. The turned-on control transistor SCT may output, to the output terminal SOUT, the selection signal SEL according to a voltage level of the enable signal EN. As shown in FIG. 9, the selection signal SEL may be output at a high level during a period in which the voltage of the pull-down node Npd of the corresponding stage ST is at a low level and the enable signal EN is at a high level. The selection signal SEL may be output at a low level during a period in which the voltage of the pull-down node Npd of the corresponding stage ST is at a low level and the enable signal EN is at a low level.

According to an embodiment, the corresponding stage ST may be one of the first driving circuit 131, the second driving circuit 133, the third driving circuit 135, or the fourth driving circuit 137. For example, the corresponding stage ST may be a stage EST of the third driving circuit 135, and the masking driving circuit 139 may output the selection signal SEL to the first driving circuit 131 and the second driving circuit 133.

As shown in FIG. 6, when the fourth gate signal EM is at a high level, the pixel PX may operate during the non-emission period, and when the fourth gate signal EM is at a low level, the pixel PX may operate during the emission period. According to an embodiment, the controller 190 described above with reference to FIG. 4 may control the outputs of the first driving circuit 131 and the second driving circuit 133 by controlling the input and output signals (e.g., the enable signal EN and the selection signal SEL) of the masking driving circuit 139. For example, the controller 190 may control a timing at which the enable signal EN of a high level is supplied, so that the second gate signal GI of a gate-on voltage (e.g., a high-level voltage), the third gate signal GC of a gate-on voltage (e.g., a high-level voltage), and the first gate signal GW of a gate-on voltage (e.g., a low-level voltage) are not supplied while the fourth gate signal EM of a high level is supplied to the pixel PX.

In FIGS. 4 to 9, for convenience of illustration, the masking driving circuit 139 is shown as a driving circuit provided separately from the third driving circuit 135, but the present disclosure is not limited thereto, and in other embodiments, the masking driving circuit 139 may be provided as a portion of the third driving circuit 135. For example, the control transistor SCT, the reset transistor RST, and the capacitor C may be some components of the corresponding stage ST, which are connected to the pull-down node Npd of the corresponding stage ST.

Figure 10:
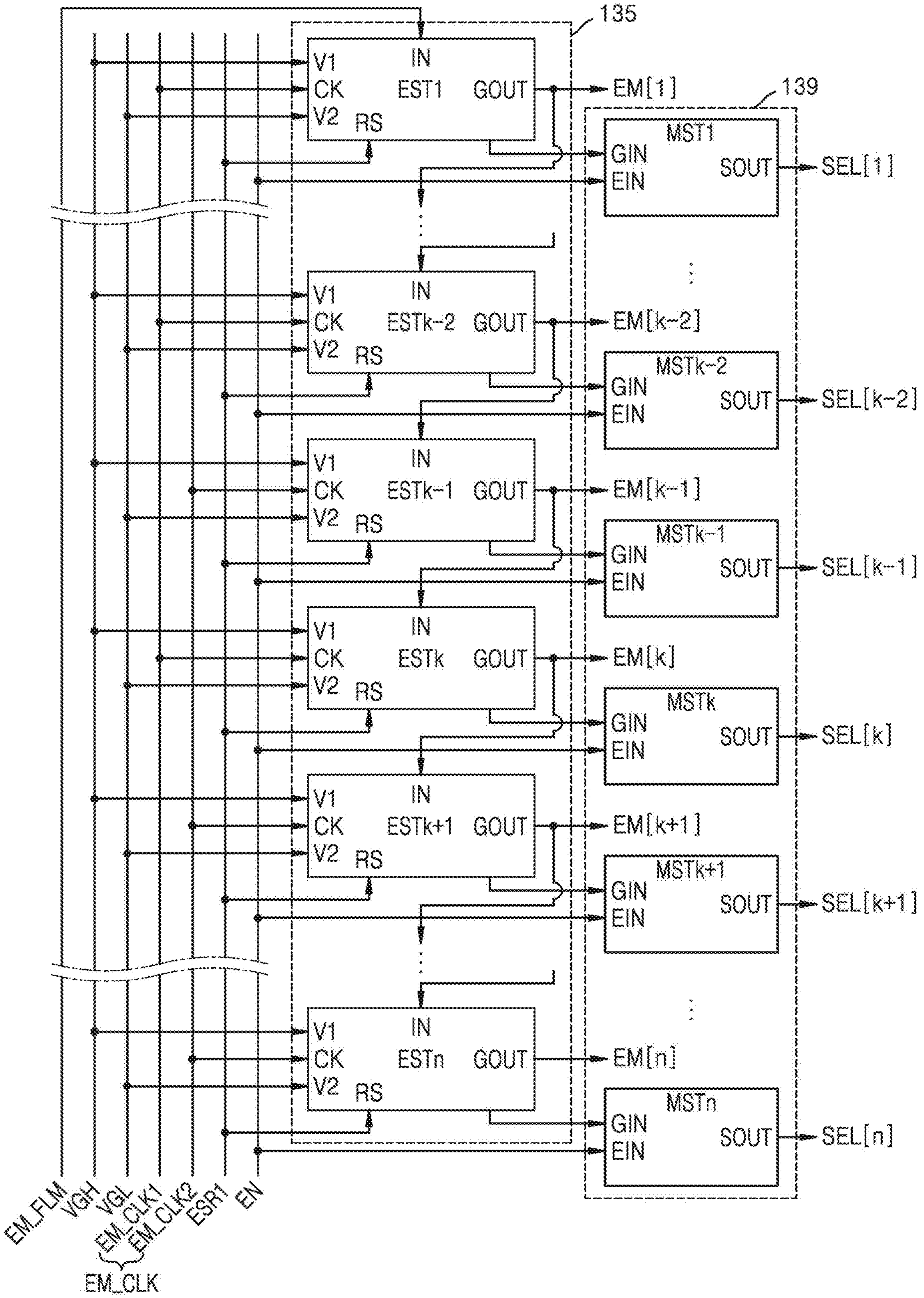
FIG. 10 is a block diagram schematically illustrating a third driving circuit and a masking driving circuit according to an embodiment.

FIG. 10 is a diagram schematically showing the third driving circuit 135 and the masking driving circuit 139 according to an embodiment.

Referring to FIG. 10, the third driving circuit 135 according to an embodiment may include a plurality of stages EST1 to ESTn.

The start signal STV may be input (e.g., may be supplied) to the input terminal IN of each of the stages EST1 to ESTn. The start signal STV may be an external signal EM_FLM, or a fourth gate signal (hereinafter, referred to as a previous output signal) output by a previous stage. The external signal EM_FLM may be input as the start signal STV to the input terminal IN of the first stage EST1, and the previous output signal may be input as the start signal STV to the input terminal IN of each of the second to (n)th stages EST2 to ESTn.

The first voltage VGH may be input to the first voltage input terminal V1 of each of the stages EST1 to ESTn, and the second voltage VGL may be input to the second voltage input terminal V2 of each of the stages EST1 to ESTn. The second voltage VGL may be lower than the first voltage VGH.

A clock signal EM_CLK may be input to the clock terminal CK of each of the stages EST1 to ESTn. The clock signal EM_CLK may include a first clock signal EM_CLK1 and a second clock signal EM_CLK2. According to an embodiment, the first clock signal EM_CLK1 may be input to the clock terminal CK of the odd stages EST1, EST3, and so on, and the second clock signal EM_CLK2 may be input to the clock terminal CK of the even stages EST2, EST4, and so on. As another example, the second clock signal EM_CLK2 may be input to the clock terminal CK of the odd stages EST1, EST3, and so on, and the first clock signal EM_CLK1 may be input to the clock terminal CK of the even stages EST2, EST4, and so on.

The first clock signal EM_CLK1 and the second clock signal EM_CLK2 may be square wave signals that repeat a high-level voltage and a low-level voltage. According to an embodiment, the first clock signal EM_CLK1 and the second clock signal EM_CLK2 may be square wave signals that repeat the first voltage VGH and the second voltage VGL. The first clock signal EM_CLK1 and the second clock signal EM_CLK2 may be signals in which phases thereof are shifted while having a same waveform as each other. For example, the second clock signal EM_CLK2 may be input in a same waveform as that of the first clock signal EM_CLK1, while phases thereof are shifted (e.g., the phases are delayed) by a suitable interval (e.g., a certain or predetermined) interval.

The fourth gate signals EM[1], . . . , EM[k−2], EM[k−1], EM[k], EM[k+1], . . . , EM[n] may be sequentially output from the output terminals GOUT of the stages EST1 to ESTn, respectively.

A reset signal ESR1 may be input to a reset terminal RS of each of the stages EST1 to ESTn.

The masking driving circuit 139 according to an embodiment may include a plurality of stages MST1 to MSTn.

A node signal of a corresponding stage from among the stages EST1 to ESTn of the third driving circuit 135 may be input to a first input terminal GIN of each of the stages MST1 to MSTn.

The enable signal EN may be input to the second input terminal EIN of each of the stages MST1 to MSTn.

Selection signals SEL[1], . . . , SEL[k−2], SEL[k−1], SEL[k], SEL[k+1], . . . , SEL[n] may be output from the output terminals SOUT of the stages MST1 to MSTn, respectively.

Figure 11:
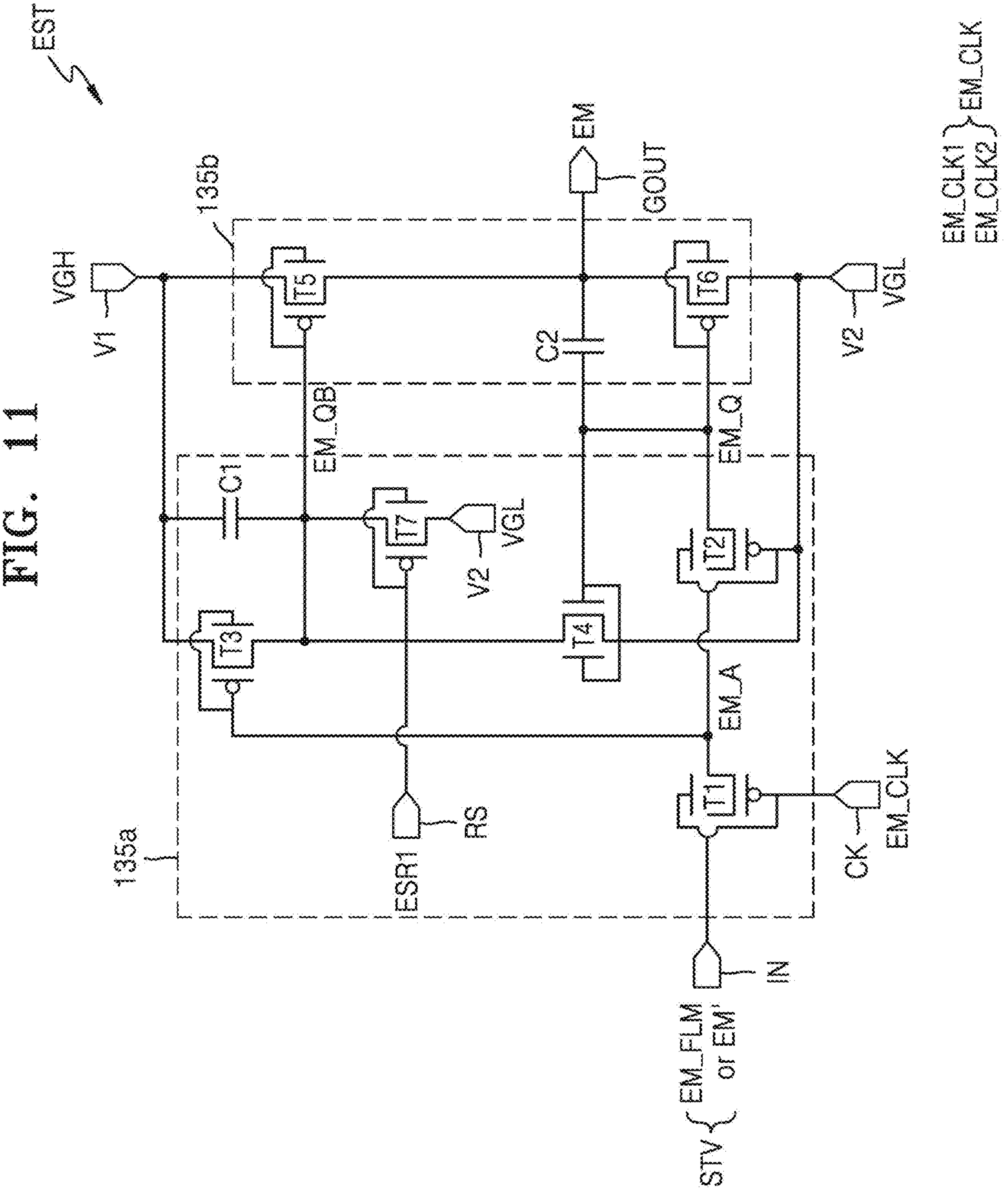
FIG. 11 is an equivalent circuit diagram schematically illustrating a stage of a third driving circuit according to an embodiment.

FIG. 11 is an equivalent circuit diagram schematically illustrating the stage EST of a third driving circuit according to an embodiment.

Referring to FIG. 11, each stage EST of the third driving circuit may include a control circuit 135*a* and an output circuit 135*b*. The control circuit 135*a* and the output circuit 135*b* may each include at least one transistor. The at least one transistor may include an N-channel transistor and/or a P-channel transistor. For example, a fourth transistor T4 may be an N-channel transistor, and a first transistor T1, a second transistor T2, a third transistor T3, a fifth transistor T5, a sixth transistor T6, and a seventh transistor T7 may be P-channel transistors.

A gate-on voltage of the p-channel transistor may be a low-level voltage, and a gate-off voltage thereof may be a high-level voltage. A gate-on voltage of the n-channel transistor may be a high-level voltage, and a gate-off voltage thereof may be a low-level voltage.

The control circuit 135*a* may control voltages of a first node EM_Q (e.g., the pull-down node Npd of FIG. 8A) and a second node EM_QB (e.g., the pull-up node Npu of FIG. 8A), in response to the start signal STV (e.g., the external signal EM_FLM of FIG. 10 or a previous output signal EM'). The control circuit 135*a* may include the first to fourth transistors T1 to T4 and a first capacitor C1.

The first transistor T1 may be connected between the input terminal IN and the second transistor T2. The gate of the first transistor T1 may be connected to the clock terminal CK. The first transistor T1 is turned on when the clock signal EM_CLK input to the clock terminal CK is at a low level, and may transmit the start signal STV input to the input terminal IN to one terminal (e.g., a gate or a third node EM_A) of the third transistor T3. The clock signal EM_CLK may include the first clock signal EM_CLK1 and the second clock signal EM_CLK2.

The second transistor T2 may be connected between the first transistor T1 and the first node EM_Q. The gate of the second transistor T2 may be connected to the second voltage input terminal V2. The second transistor T2 may be turned on by the second voltage VGL input to the second voltage input terminal V2, and may transmit the start signal STV received through the first transistor T1 to the first node EM_Q. The second transistor T2 may always be in a turned-on state (e.g., may be an always turned-on transistor).

The third transistor T3 may be connected between the first voltage input terminal V1 and the second node EM_QB. The gate of the third transistor T3 may be connected to the third node EM_A. The third transistor T3 may be turned on when the start signal STV transmitted to the third node EM_A is at a low level, and may transmit the first voltage VGH input to the first voltage input terminal V1 to the second node EM_QB.

The fourth transistor T4 may be connected between the second node EM_QB and the second voltage input terminal V2. The gate of the fourth transistor T4 may be connected to the first node EM_Q. The fourth transistor T4 may be turned on when a voltage of the first node EM_Q is at a high level, and may transmit the second voltage VGL input to the second voltage input terminal V2 to the second node EM_QB.

The third transistor T3 and the fourth transistor T4 may control a voltage of the second node EM_QB according to a voltage of the third node EM_A or the first node EM_Q.

The first capacitor C1 may be connected between the first voltage input terminal V1 and the second node EM_QB. The first capacitor C1 may maintain or substantially maintain a voltage of the second node EM_QB.

The control circuit 135*a* may further include the seventh transistor T7 as a reset transistor. The seventh transistor T7 may be connected between the second node EM_QB and the second voltage input terminal V2. The gate of the seventh transistor T7 may be connected to the reset terminal RS. The seventh transistor T7 may be turned on when the reset signal ESR1 is at a low level, and may reset a voltage of the second node EM_QB to the second voltage VGL. The reset signal ESR1 may be a separate signal from the reset signal ESR (e.g., see FIGS. 8A and 8B) input to the masking driving circuit 139.

The output circuit 135*b* may be connected between the first voltage input terminal V1 and the second voltage input terminal V2. The output circuit 135*b* may output the fourth gate signal EM of a high-level voltage or a low-level voltage according to the voltages of the first node EM_Q and second node EM_QB. The output circuit 135*b* may include the fifth transistor T5 and the sixth transistor T6. The output circuit 135*b* may further include a second capacitor C2.

The fifth transistor T5 may be connected between the first voltage input terminal V1 and the output terminal GOUT. The gate of the fifth transistor T5 may be connected to the second node EM_QB. The fifth transistor T5 may be a pull-up transistor to transmit a high-level voltage to the output terminal GOUT. The fifth transistor T5 may be turned on when the voltage of the second node EM_QB is at a low level, and may transmit the first voltage VGH of a high-level voltage to the output terminal GOUT.

The sixth transistor T6 may be connected between the output terminal GOUT and the second voltage input terminal V2. The gate of the sixth transistor T6 may be connected to the first node EM_Q. The sixth transistor T6 may be a pull-down transistor to transmit a low-level voltage to the output terminal GOUT. The sixth transistor T6 may be turned on when the voltage of the first node EM_Q is at a low level, and may transmit the second voltage VGL of a low-level voltage to the output terminal GOUT.

The second capacitor C2 may be connected between the output terminal GOUT and the first node EM_Q. The second capacitor C2 may maintain or substantially maintain the voltage of the first node EM_Q.

According to an embodiment, the first to seventh transistors T1 to T7 may each be a dual-gate transistor further including a back gate that receives a same signal as the gate thereof.

Figure 12A:
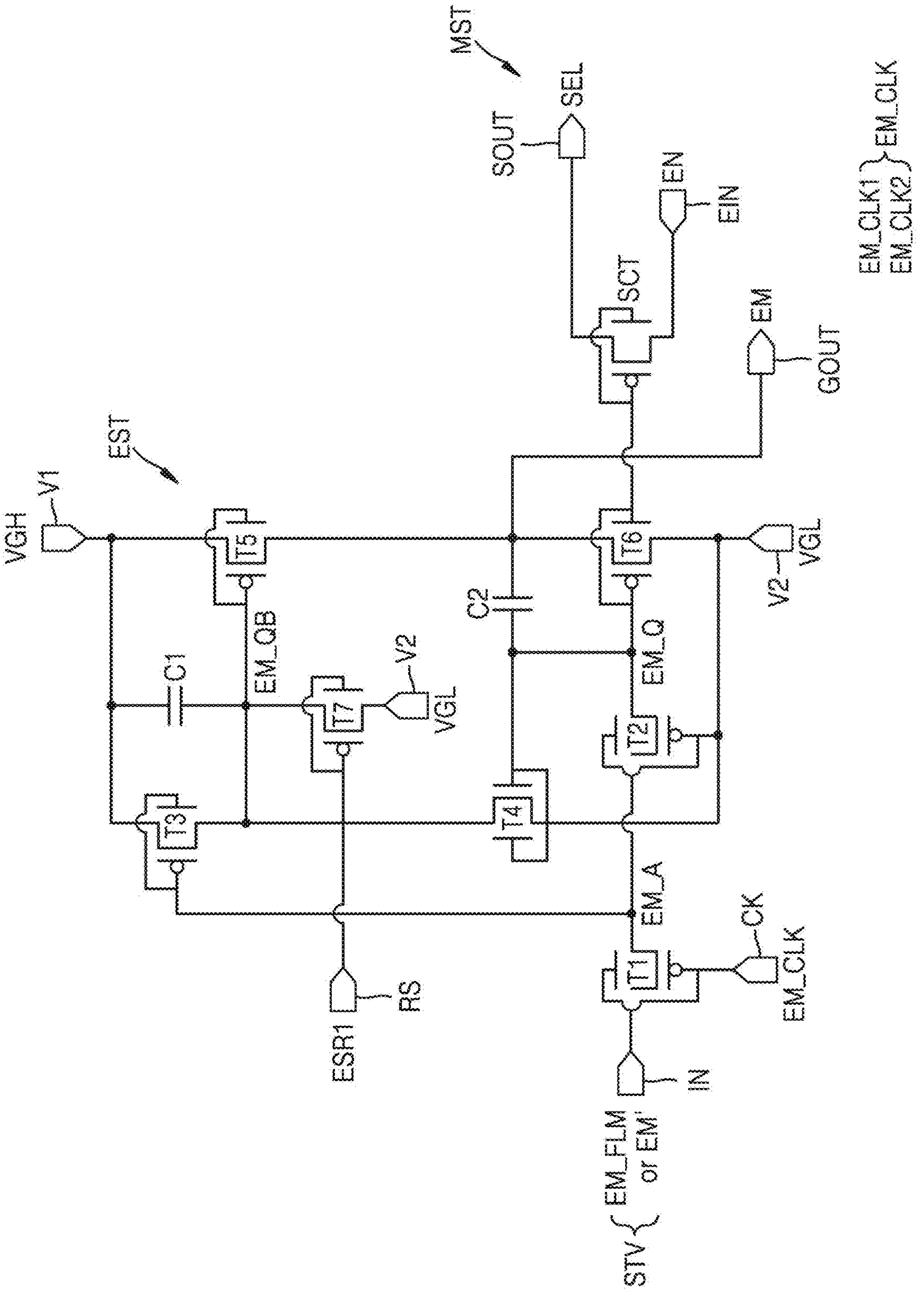
FIGS. 12A and 12B are equivalent circuit diagrams schematically illustrating stages of a third driving circuit and a masking driving circuit.
Figure 12B:
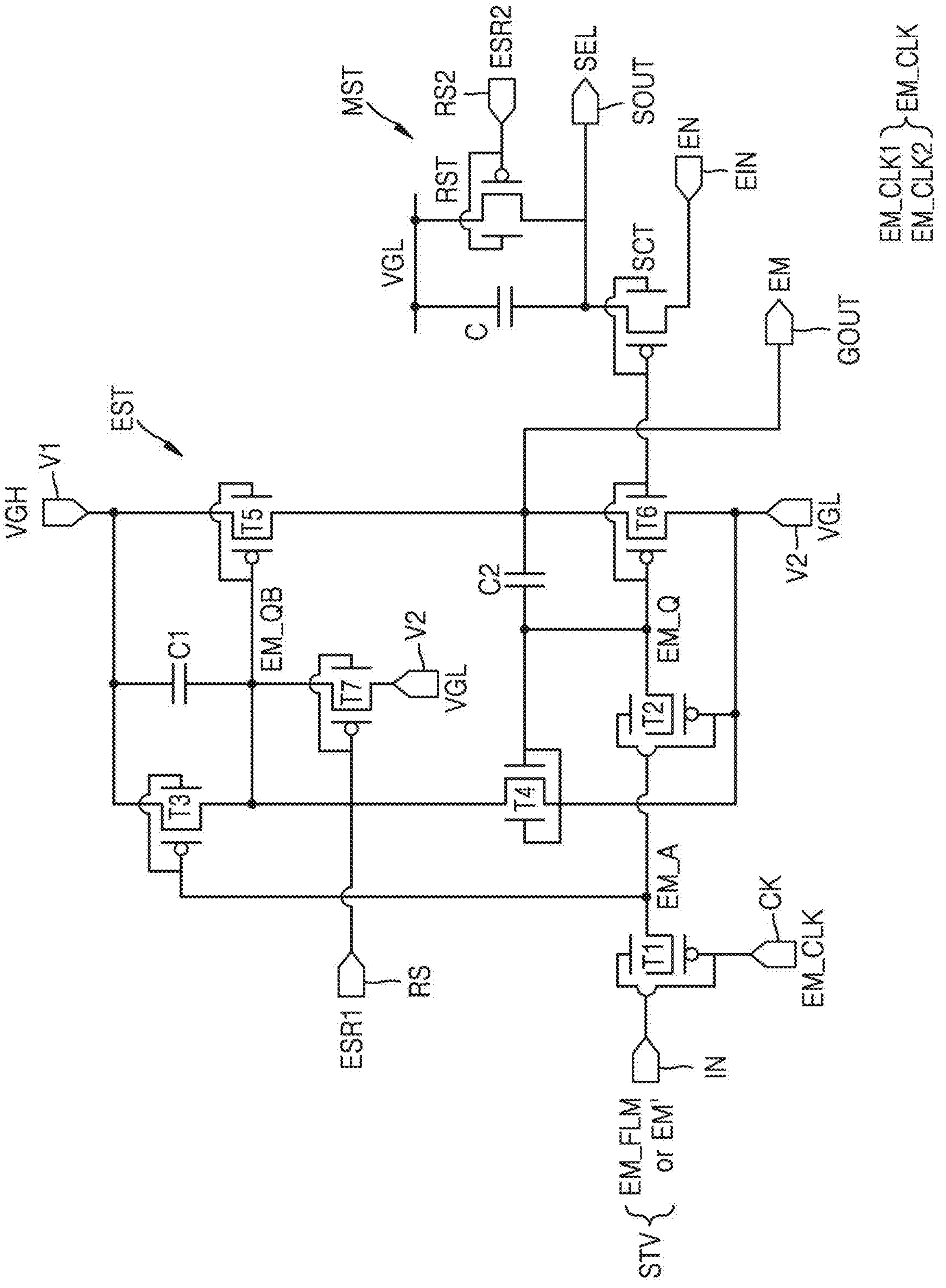
Figure 13:
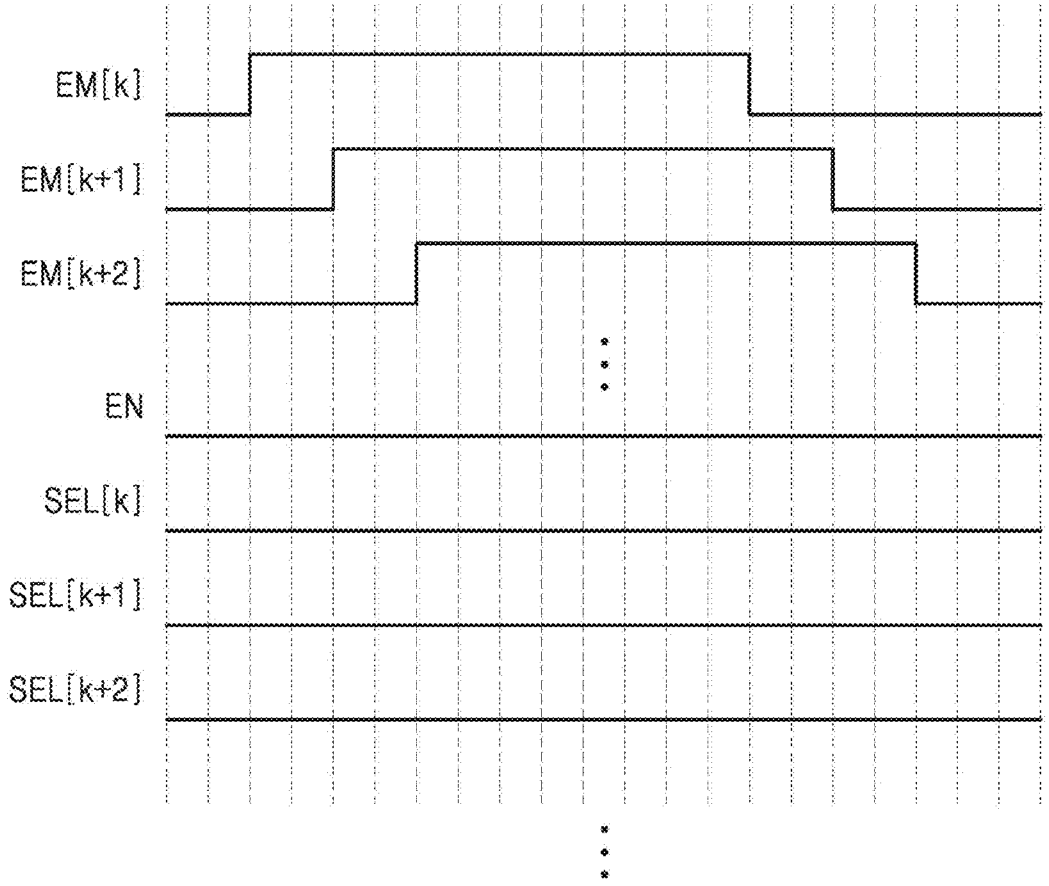
FIG. 13 is a signaling diagram showing outputs in a first driving mode of a third driving circuit and a masking driving circuit according to an embodiment.
Figure 14:
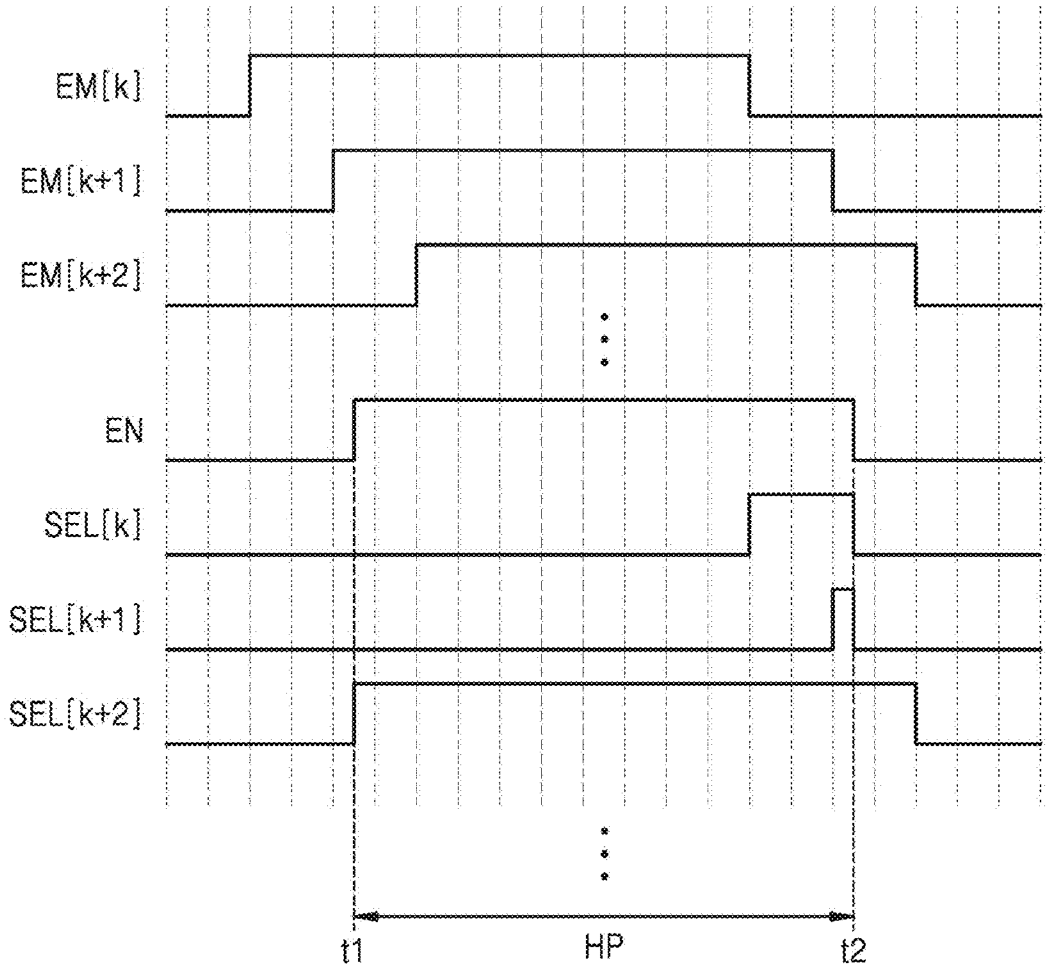
FIG. 14 is a signaling diagram showing outputs in a second driving mode of a third driving circuit and a masking driving circuit according to an embodiment.

FIGS. 12A and 12B are equivalent circuit diagrams schematically illustrating the stages EST and MST of the third driving circuit 135 and the masking driving circuit 139. FIG. 13 is a signaling diagram showing outputs in a first driving mode of the third driving circuit 135 and the masking driving circuit 139 according to an embodiment. FIG. 14 is a signaling diagram showing outputs in a second driving mode of the third driving circuit 135 and the masking driving circuit 139 according to an embodiment.

FIG. 12A illustrates the stage EST of the third driving circuit 135 described above with reference to FIG. 11, and the stage MST of the masking driving circuit 139 described above with reference to FIG. 8A. FIG. 12B illustrates the stage EST of the third driving circuit 135 described above with reference to FIG. 11, and the stage MST of the masking driving circuit 139 described above with reference to FIG. 8B.

FIGS. 13 and 14 illustrate the fourth gate signals EM[k], EM[k+1], and EM[k+2] output from (k)th to (k+2)th stages EST of the third driving circuit 135, and selection signals SEL[k], SEL[k+1], and SEL[k+2] output from (k)th to (k+2)th stages MST of the masking driving circuit 139. For convenience of illustration, the (k+2)th stage EST to the (k+i)th stage EST of the third driving circuit 135 may correspond to pixel rows to which a driving frequency lower than a driving frequency of the first driving mode are applied. Here, i is an integer greater than or equal to 1 and less than or equal to n.

Referring to FIG. 13, in the first driving mode, the enable signal EN of a low level may be input to the masking driving circuit 139. Each stage MST of the masking driving circuit 139 may output the selection signal SEL of a low level based on the enable signal EN of the low level, regardless of a voltage level of the voltage of the first node EM_Q of each stage EST of the third driving circuit 135.

Referring to FIG. 14, in the second driving mode, the enable signal EN of a high level may be input to the masking driving circuit 139 at a suitable timing (e.g., a certain or predetermined timing). A length of a period HP in which the enable signal EN is at a high level may be determined by a timing at which an output signal (e.g., a voltage of the first node EM_Q) of the stage EST of at least one third driving circuit 135 is at a high level. In this case, the at least one third driving circuit 135 may correspond to at least one pixel row (e.g., a variable frequency area among a display area) in which an output of a gate signal may be blocked (e.g., may be masked).

A timing t1 at which the enable signal EN transitions from the low level to the high level may be the same or substantially the same as or before a timing at which an output signal of at least the (k+2)th stage EST (e.g., the (k+2)th fourth gate signal EM[k+2] or the voltage of the first node EM_Q) transitions from the low level to the high level. A timing t2 at which the enable signal EN transitions from the high level to the low level may be the same as or substantially the same as or later than a timing at which an output signal of at least the (k+i)th stage EST (e.g., the (k+i)th fourth gate signal EM[k+i] or the voltage of the first node EM_Q) transitions from the low level to the high level.

The control transistor SCT may be turned on, and the (k)th selection signal SEL[k] of a high level may be output during a period in which the output signal of the (k)th stage EST of the third driving circuit 135 (e.g., the (k)th fourth gate signal EM[k] or the voltage of the first node EM_Q) is at a low level and the enable signal EN is at a high level.

The control transistor SCT may be turned on, and the (k+1)th selection signal SEL[k+1] of a high level may be output during a period in which the output signal of the (k+1)th stage EST of the third driving circuit 135 (e.g., the (k+1)th fourth gate signal EM[k+1] or the voltage of the first node EM_Q) is at a low level and the enable signal EN is at a high level.

The control transistor SCT may be turned on, and the (k+2)th selection signal SEL[k+2] of a high level may be output during a period in which the output signal of the (k+2)th stage EST of the third driving circuit 135 (e.g., the (k+2)th fourth gate signal EM[k+2] or the voltage of the first node EM_Q) is at a low level and the enable signal EN is at a high level. Then, the control transistor SCT may be turned off when the output signal of the (k+2)th stage EST (e.g., the (k+2)th fourth gate signal EM[k+2] or the voltage of the first node EM_Q) transitions from a low level to a high level. At this time, a voltage of the output terminal SOUT maintains a high level, and thus, the (k+2)th selection signal SEL[k+2] of a high level may be continuously output. Then, the control transistor SCT may be turned on when the output signal of the (k+2)th stage EST (e.g., the (k+2)th fourth gate signal EM[k+2] or the voltage of the first node EM_Q) transitions from a high level to a low level. Accordingly, the enable signal EN of a low level may be transmitted to the output terminal SOUT, and the (k+2)th selection signal SEL[k+2] of a low level may be output.

High-level periods of the selection signals SEL output by the (k+2)th to (k+i)th stages MST of the masking driving circuit 139, which may be connected to the (k+2)th to (k+i)th) stages EST corresponding to the variable frequency area of the third driving circuit 135, may overlap with high-level periods of the fourth gate signals EM (e.g., at least the first period P1 to the fourth period P4 described above with reference to FIG. 6). A starting point (e.g., the timing t1) of a high level of the selection signals SEL input to the variable frequency area may match a starting point of a high level of the enable signal EN.

Figure 15:
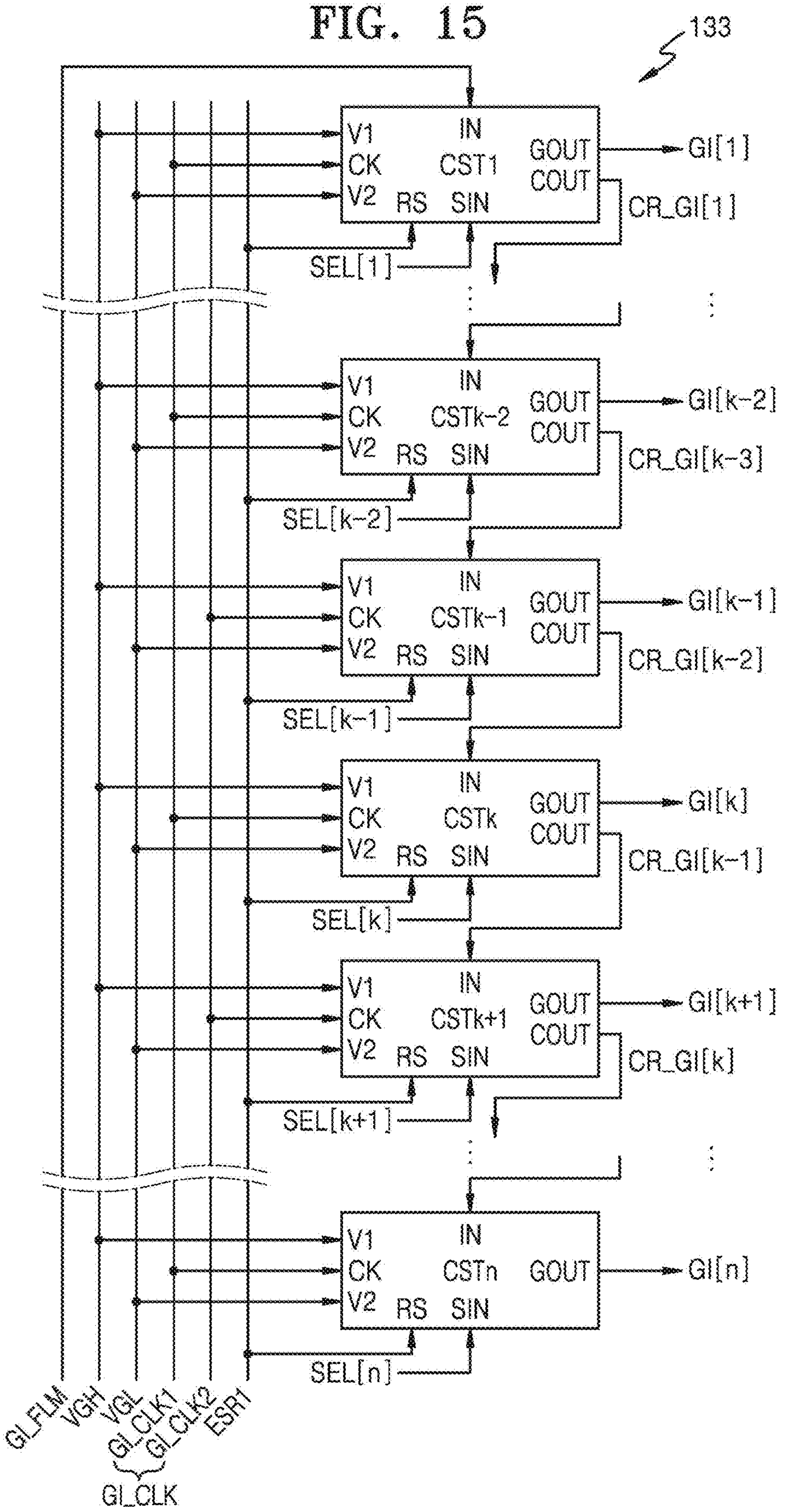
FIG. 15 is a block diagram schematically illustrating a second driving circuit according to an embodiment.
Figure 16:
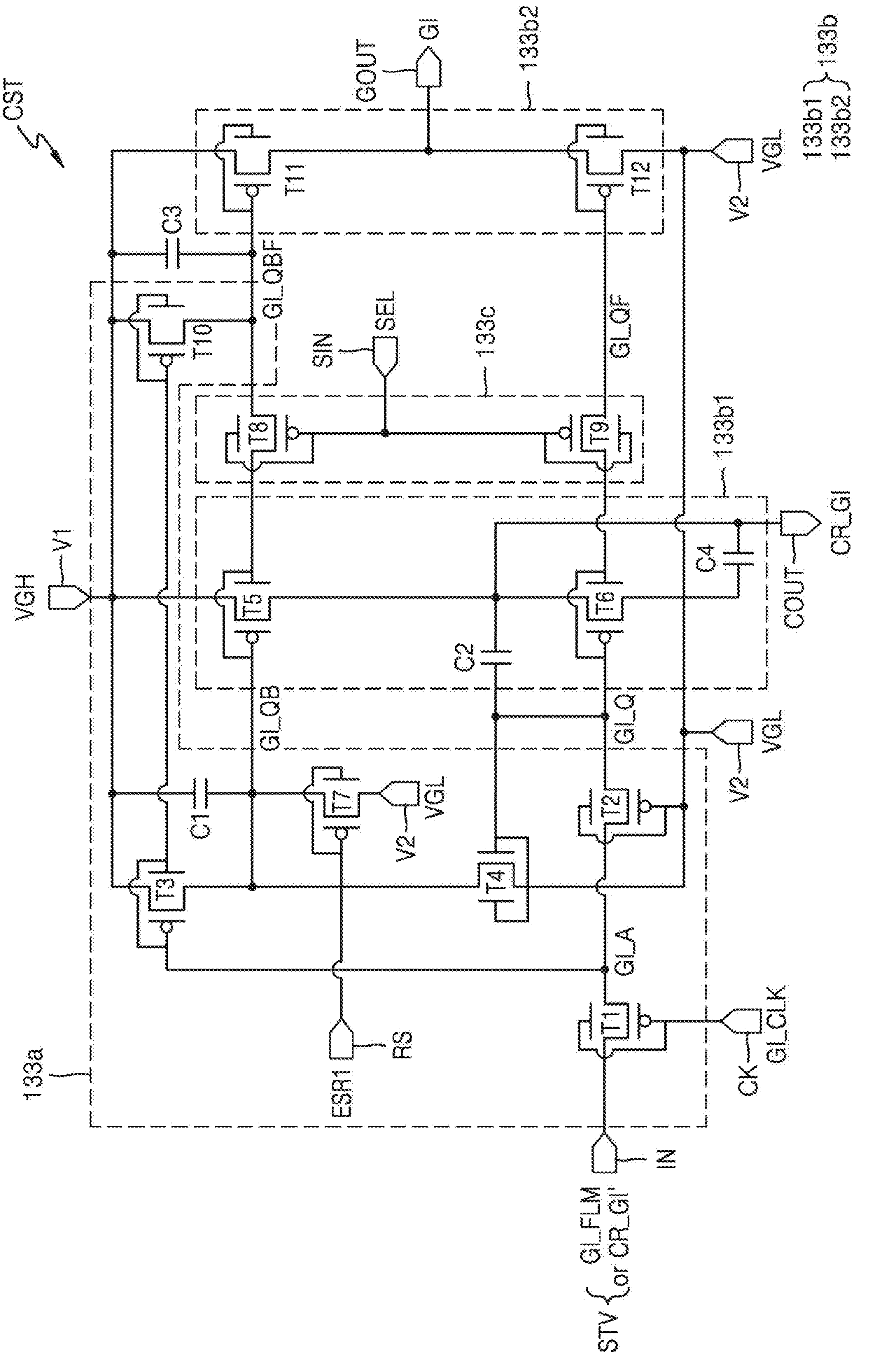
FIG. 16 is an equivalent circuit diagram schematically illustrating a stage of a second driving circuit according to an embodiment.
Figure 17:
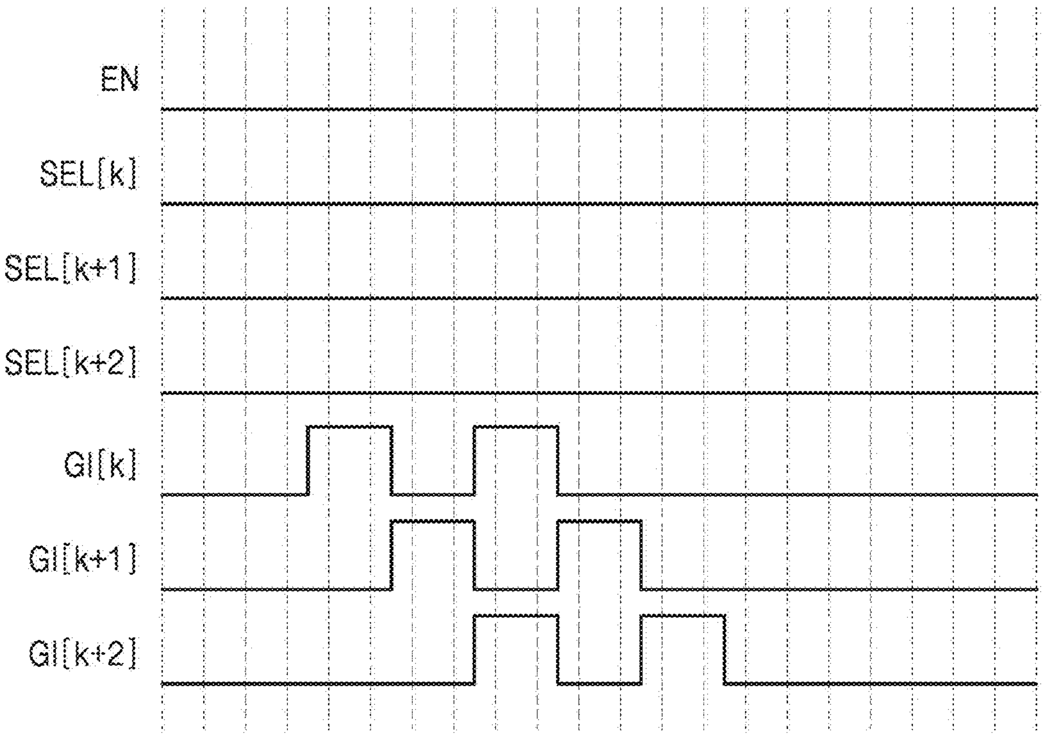
FIG. 17 is a signaling diagram showing outputs of a second driving circuit in a first driving mode according to an embodiment.
Figure 18:
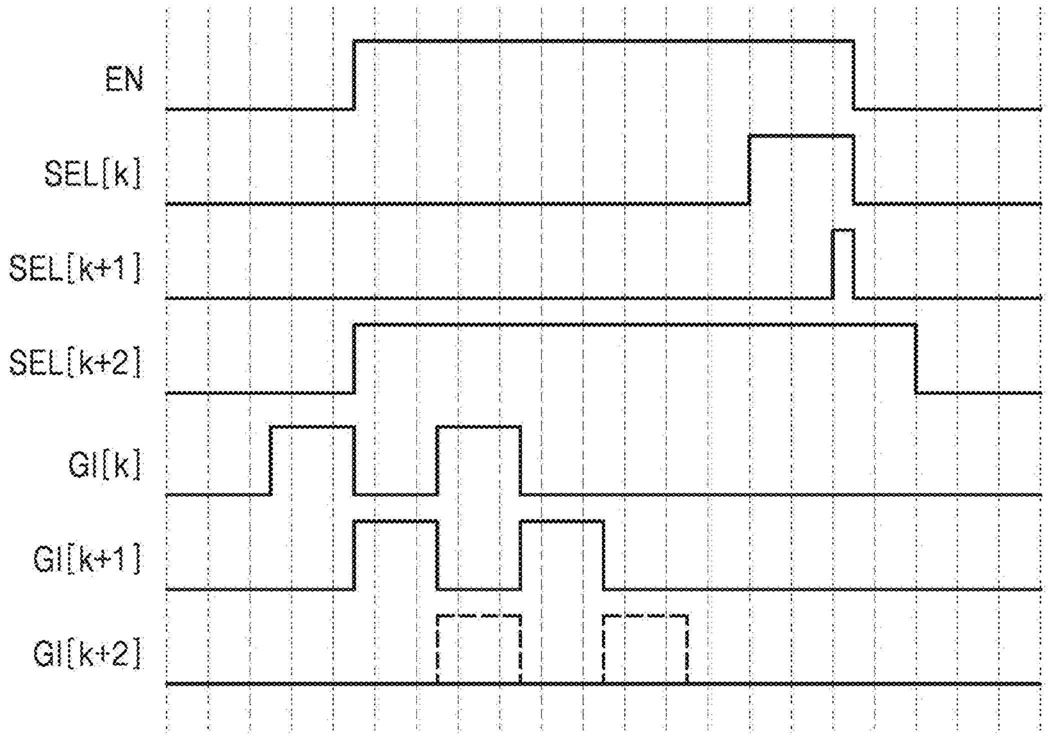
FIG. 18 is a signaling diagram showing outputs of a second driving circuit in a second driving mode according to an embodiment.

FIG. 15 is a block diagram schematically illustrating the second driving circuit 133 according to an embodiment. FIG. 16 is an equivalent circuit diagram schematically showing a stage CST of the second driving circuit 133 according to an embodiment. FIG. 17 is a signaling diagram showing outputs of the second driving circuit 133 in the first driving mode according to an embodiment. FIG. 18 is a signaling diagram showing outputs of the second driving circuit 133 in the second driving mode according to an embodiment.

Referring to FIG. 15, the second driving circuit 133 according to an embodiment may include a plurality of stages CST1 to CSTn.

The start signal STV may be input (e.g., may be supplied) to the input terminal IN of each of the stages CST1 to CSTn. The start signal STV may be an external signal GI_FLM, or a carry signal (hereinafter, referred to as a previous carry signal) output by a previous stage. The external signal GI_FLM may be input as the start signal STV to the input terminal IN of the first stage CST1, and previous carry signals CR_GI[1], . . . , CR_GI[k−2], CR_GI[k−1], CR_GI[k], CR_GI[k+1], . . . , CR_GI[n−1] may be input as the start signals STV to the input terminals IN of the second to (n)th stages CST2 to CSTn, respectively.

The first voltage VGH may be input to the first voltage input terminal V1 of each of the stages CST1 to CSTn, and the second voltage VGL may be input to the second voltage input terminal V2 of each of the stages CST1 to CSTn. The second voltage VGL may be lower than the first voltage VGH.

A clock signal GI_CLK may be input to the clock terminal CK of each of the stages CST1 to CSTn. The clock signal GI_CLK may include a first clock signal GI_CLK1 and a second clock signal GI_CLK2. According to an embodiment, the first clock signal GI_CLK1 may be input to the clock terminal CK of the odd stages CST1, CST3, and so on, and the second clock signal GI_CLK2 may be input to the clock terminal CK of the even stages CST2, CST4, and so on. As another example, the second clock signal GI_CLK2 may be input to the clock terminal CK of the odd stages CST1, CST3, and so on, and the first clock signal GI_CLK1 may be input to the clock terminal CK of the even stages CST2, CST4, and so on.

The first clock signal GI_CLK1 and the second clock signal GI_CLK2 may be square wave signals that repeat a high-level voltage and a low-level voltage. According to an embodiment, the first clock signal GI_CLK1 and the second clock signal GI_CLK2 may be square wave signals that repeat the first voltage VGH and the second voltage VGL. The first clock signal GI_CLK1 and the second clock signal GI_CLK2 may be signals in which phases thereof are shifted while having a same waveform as each other. For example, the second clock signal GI_CLK2 may be input in a same waveform as that of the first clock signal GI_CLK1, while phases thereof are shifted (e.g., the phases are delayed) by a suitable interval (e.g., a certain or predetermined interval).

The reset signal ESR1 may be input to the reset terminals RS of the stages CST1 to CSTn.

The selection signals SEL[1], . . . , SEL[k−2], SEL[k−1], SEL[k], SEL[k+1], . . . , SEL[n] may be input to selection signal input terminals SIN of the stages CST1 to CSTn, respectively.

Second gate signals GI[1], . . . , GI[k−2], GI[k−1], GI[k], GI[k+1], . . . , GI[n] may be sequentially output from the output terminals GOUT of the stages CST1 to CSTn, respectively. According to an embodiment, the second gate signals GI[1], . . . , GI[k−2], GI[k−1], GI[k], GI[k+1], . . . , GI[n] may be third gate signals of a previous stage.

Carry signals CR_GI[1], . . . , CR_GI[k−2], CR_GI[k−1], CR_GI[k], CR_GI[k+1], . . . , CR_GI[n] may be output from carry terminals COUT of the stages CST1 to CSTn, respectively.

Referring to FIG. 16, each stage CST of the second driving circuit 133 may include a control circuit 133*a*, an output circuit 133*b*, and a masking circuit 133*c*. The control circuit 133*a*, the output circuit 133*b*, and the masking circuit 133*c* may each include at least one transistor. The at least one transistor may include an N-channel transistor and/or a P-channel transistor. For example, a fourth transistor T4 may be an N-channel transistor, and a first transistor T1, a second transistor T2, a third transistor T3, a fifth transistor T5, a sixth transistor T6, a seventh transistor T7, an eighth transistor T8, a ninth transistor T9, a tenth transistor T10, an eleventh transistor T11, and a twelfth transistor T12 may be P-channel transistors.

The control circuit 133*a* may control voltages of a first node GI_Q and a second node GI_QB in response to the start signal STV (e.g., the external signal GI_FLM of FIG. 15 or a previous carry signal CR_GI'). The control circuit 133*a* may further include the first to fourth transistors T1 to T4, the seventh transistor T7, the tenth transistor T10, the first capacitor C1, and a third capacitor C3.

The first transistor T1 may be connected between the input terminal IN and the second transistor T2. The gate of the first transistor T1 may be connected to the clock terminal CK. The first transistor T1 is turned on when the clock signal GI_CLK input to the clock terminal CK is at a low level, and may transmit the start signal STV input to the input terminal IN to one terminal of the second transistor T2 and a gate of the third transistor T3 (e.g., a third node GI_A). The clock signal GI_CLK may include the first clock signal GI_CLK1 and the second clock signal GI_CLK2.

The second transistor T2 may be connected between the first transistor T1 and the first node GI_Q. The gate of the second transistor T2 may be connected to the second voltage input terminal V2. The second transistor T2 may be turned on by the second voltage VGL input to the second voltage input terminal V2, and may transmit the start signal STV received through the first transistor T1 to the first node GI_Q. The second transistor T2 may always be in a turned-on state.

The third transistor T3 may be connected between the first voltage input terminal V1 and the second node GI_QB. The gate of the third transistor T3 may be connected to the third node GI_A. The third transistor T3 may be turned on when the start signal STV transmitted to the third node GI_A is at a low level, and may transmit the first voltage VGH input to the first voltage input terminal V1 to the second node GI_QB.

The fourth transistor T4 may be connected between the second node GI_QB and the second voltage input terminal V2. The gate of the fourth transistor T4 may be connected to the first node GI_Q. The fourth transistor T4 may be turned on when a voltage of the first node GI_Q is at a high level, and may transmit the second voltage VGL input to the second voltage input terminal V2 to the second node GI_QB.

The third transistor T3 and the fourth transistor T4 may control a voltage of the second node GI_QB according to a voltage of the third node GI_A or the first node GI_Q.

The first capacitor C1 may be connected between the first voltage input terminal V1 and the second node GI_QB. The first capacitor C1 may maintain or substantially maintain a voltage of the second node GI_QB.

The seventh transistor T7 may be connected between the second node GI_QB and the second voltage input terminal V2. The gate of the seventh transistor T7 may be connected to the reset terminal RS. The seventh transistor T7 may be turned on when the reset signal ESR1 is at a low level, and may reset a voltage of the second node GI_QB to the second voltage VGL. The seventh transistor T7 may be omitted as needed or desired.

The tenth transistor T10 may be connected between the first voltage input terminal V1 and a fourth node GI_QBF. A gate of the tenth transistor T10 may be connected to the third node GI_A. The tenth transistor T10 may be turned on when the start signal STV transmitted to the third node GI_A is at a low level, and may transmit the first voltage VGH input to the first voltage input terminal V1 to the fourth node GI_QBF.

The third capacitor C3 may be connected between the first voltage input terminal V1 and the fourth node GI_QBF. The third capacitor C3 may maintain or substantially maintain a voltage of the fourth node GI_QBF.

The output circuit 133*b* may include a first output circuit 133*b*1 and a second output circuit 133*b*2. The output circuit 133*b* may be connected between the first voltage input terminal V1 and the second voltage input terminal V2.

The first output circuit 133*b*1 may output a carry signal CR_GI of a high-level voltage or a low-level voltage according to the voltages of the first node GI_Q and the second node GI_QB. The first output circuit 133*b*1 may include the fifth transistor T5 and the sixth transistor T6. The first output circuit 133*b*1 may further include the second capacitor C2 and a fourth capacitor C4.

The fifth transistor T5 may be connected between the first voltage input terminal V1 and the carry terminal COUT. The gate of the fifth transistor T5 may be connected to the second node GI_QB. The fifth transistor T5 may be a pull-up transistor to transmit a high-level voltage to the carry terminal COUT. The fifth transistor T5 may be turned on when the voltage of the second node GI_QB is at a low level, and may transmit the first voltage VGH of a high-level voltage to the carry terminal COUT.

The sixth transistor T6 may be connected between the carry terminal COUT and the fourth capacitor C4. The gate of the sixth transistor T6 may be connected to the first node GI_Q. The sixth transistor T6 may be a pull-down transistor to transmit a low-level voltage to the carry terminal COUT. The sixth transistor T6 is turned on when the voltage of the first node GI_Q is at a low level, and the carry signal CR_GI having a level according to the voltages of the first capacitor C1 and the fourth capacitor C4 may be output from the carry terminal COUT. The fourth capacitor C4 may be connected between the sixth transistor T6 and the carry terminal COUT.

The second output circuit 133*b*2 may output the second gate signal GI and the third gate signal GC of a high-level voltage or a low-level voltage according to voltages of the fourth node GI_QBF and a fifth node GI_QF. The second output circuit 133*b*2 may include the eleventh transistor T11 and the twelfth transistor T12.

The eleventh transistor T11 may be connected between the first voltage input terminal V1 and the output terminal GOUT. A gate of the eleventh transistor T11 may be connected to the fourth node GI_QBF. The eleventh transistor T11 may be a pull-up transistor to transmit a high-level voltage to the output terminal GOUT. The eleventh transistor T11 may be turned on when the voltage of the fourth node GI_QBF is at a low level, and may transmit the first voltage VGH of a high-level voltage to the output terminal GOUT.

The twelfth transistor T12 may be connected between the output terminal GOUT and the second voltage input terminal V2. A gate of the twelfth transistor T12 may be connected to the fifth node GI_QF. The twelfth transistor T12 may be a pull-down transistor to transmit a low-level voltage to the output terminal GOUT. The twelfth transistor T12 may be turned on when a voltage of the fifth node GI_QF is at a low level, and may transmit the second voltage VGL of a low-level voltage to the output terminal GOUT.

The masking circuit 133*c* may block (e.g., may mask) outputs of the second gate signal GI and third gate signal GC of a gate-on voltage (e.g., the high-level voltage) from the second output circuit 133*b*2, in response to the selection signal SEL. The masking circuit 133*c* may be located between the first node GI_Q and/or the second node GI_QB and the second output circuit 133*b*2. The masking circuit 133*c* may block an electrical connection between the first node GI_Q and/or the second node GI_QB and the second output circuit 133*b*2 when the selection signal SEL is at a high level. The masking circuit 133*c* may include the eighth transistor T8 and the ninth transistor T9.

The eighth transistor T8 may be connected between the second node GI_QB and the fourth node GI_QBF. A gate of the eighth transistor T8 may be connected to the selection signal input terminal SIN. The eighth transistor T8 is turned on when the selection signal SEL is at a low level, and may electrically connect the fourth node GI_QBF to the second node GI_QB. The eighth transistor T8 is turned off when the selection signal SEL is at a high level, and may disconnect the fourth node GI_QBF from the second node GI_QB.

The ninth transistor T9 may be connected between the first node GI_Q and the fifth node GI_QF. A gate of the ninth transistor T9 may be connected to the selection signal input terminal SIN. The ninth transistor T9 is turned on when the selection signal SEL is at a low level, and may electrically connect the fifth node GI_QF to the first node GI_Q. The ninth transistor T9 is turned off when the selection signal SEL is at a high level, and may disconnect the fifth node GI_QF from the first node GI_Q.

While the eighth transistor T8 and the ninth transistor T9 are turned off, when the voltage of the fourth node GI_QBF maintains a high level and the voltage of the fifth node GI_QF maintains a low level, the second voltage VGL of a low-level voltage may be transmitted to the output terminal GOUT through the eleventh transistor T11. Accordingly, when the selection signal SEL is at a high level, the second output circuit 133*b*2 may not output the second gate signal GI and third gate signal GC of a high level.

According to an embodiment, the first to twelfth transistors T1 to T12 may each be a dual-gate transistor further including a back gate that receives a same signal as that of the gate thereof.

FIGS. 17 and 18 illustrate the second gate signals GI[k], GI[k+1], and GI[k+2] output from the (k)th to (k+2)th stages CST of the second driving circuit 133. The (k)th selection signal SEL[k] may be input to the (k)th stage CST, the (k+1)th selection signal SEL[k+1] may be input to the (k+1)th stage CST, and the (k+2)th selection signal SEL[k+2] may be input to the (k+2)th stage CST. For convenience of illustration, in the second driving mode, the (k+2)th stage CST to the (k+i)th stage CST of the second driving circuit 133 may correspond to pixel rows to which a driving frequency lower than the driving frequency of the first driving mode are applied.

Referring to FIG. 17, in the first driving mode, the selection signal SEL of a low level may be input to each stage CST of the second driving circuit 133. Accordingly, the eighth transistor T8 and the ninth transistor T9 may be turned on, a voltage level of the voltage of the fourth node GI_QBF may become the same or substantially the same as a voltage level of the voltage of the second node GI_QB, and a voltage level of the voltage of the fifth node GI_QF may become the same or substantially the same as a voltage level of the voltage of the first node GI_Q. When the voltage of the second node GI_QB is at a low level, the eleventh transistor T11 may be turned on, and the second gate signals GI[k], GI[k+1], and GI[k+2] of a high level may be output. When the voltage of the first node GI_Q is at a low level, the twelfth transistor T12 may be turned on, and the second gate signals GI[k], GI[k+1], and GI[k+2] of a low level may be output.

Referring to FIG. 18, in the second driving mode, the selection signal SEL may be input to each stage CST of the second driving circuit 133. Stages (e.g., the (k)th and (k+1)th stages CST) to which the selection signal SEL of a low level is input may output the second gate signals GI[k] and GI[k+1] of a high level, as the eleventh transistor T11 is turned on when the voltages of the second node GI_QB and fourth node GI_QBF are at a low level, and may output the second gate signals GI[k] and GI[k+1] of a low level, as the twelfth transistor T12 is turned on when the voltages of the first node GI_Q and fifth node GI_QF are at a low level.

When the voltages of the second node GI_QB and the fourth node GI_QBF are at a low level and the voltages of the first node GI_Q and fifth node GI_QF are at a high level, and/or when the voltages of the second node GI_QB and the fourth node GI_QBF are at a high level and the voltages of the first node GI_Q and fifth node GI_QF are at a low level, a stage (e.g., the (k+2)th stage CST) to which the selection signal SEL of a high level is input may not output the second gate signal GI[k+2] of a high level, as the eleventh transistor T11 is turned off, but may output the second gate signal GI[k+2] of a low level, as the twelfth transistor T12 is turned on. The voltage of the third node GI_A is a low level when the voltage of the first node GI_Q is a low level, and thus, the tenth transistor T10 is turned on and the voltage of the fourth node GI_QBF may be at a high level.

Based on the (k+2)th selection signal SEL[k+2] of a high level overlapping with a period in which the second gate signal GI[k+2] of a high level (e.g., a high-level signal indicated by a broken line shown in FIG. 18) is output, the (k+2)th stage CST of the second driving circuit 133 may output the second gate signal GI[k+2] of a low level.

The selection signal SEL of a high level is input to the (k+2)th stage CST to the (k+i)th stage CST from the (k+2)th stage MST to the (k+i)th stage MST, respectively, and the (k+2)th stage CST to the (k+i)th stage CST may each output the second gate signal GI[k+2] of a low level.

Figure 19:
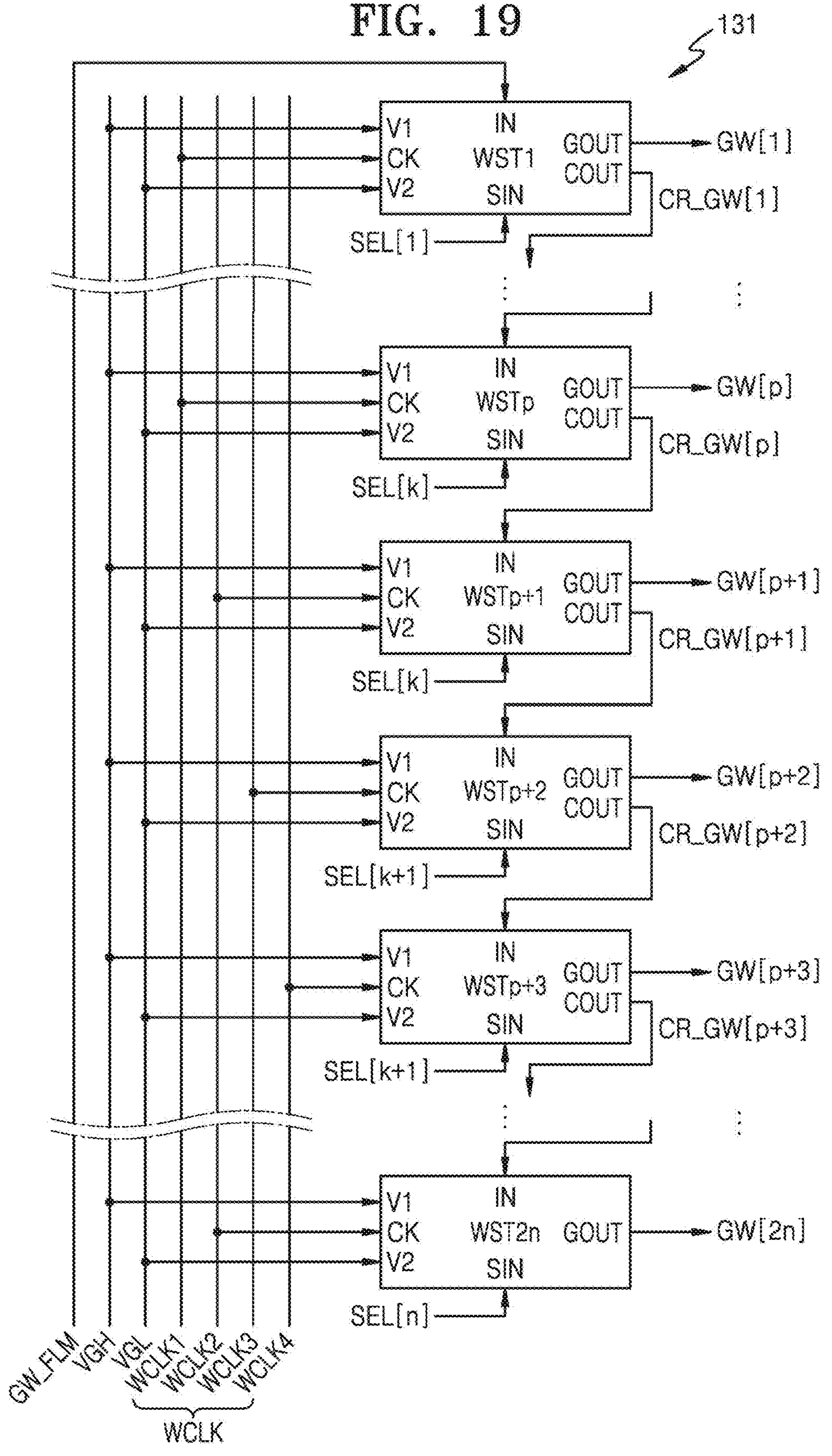
FIG. 19 is a block diagram schematically illustrating a first driving circuit according to an embodiment.
Figure 20:
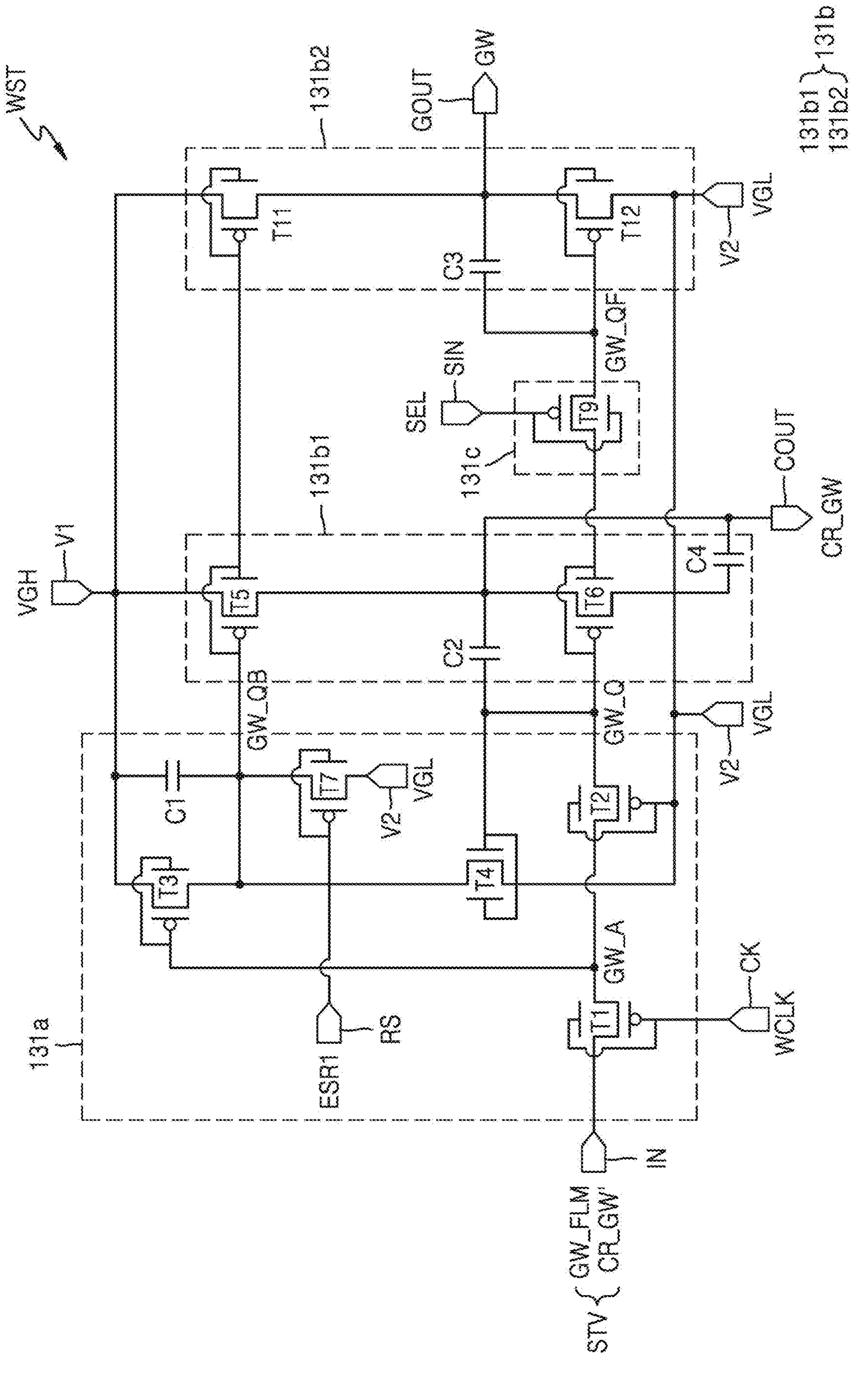
FIG. 20 is an equivalent circuit diagram schematically illustrating a stage of a first driving circuit according to an embodiment.
Figure 21:
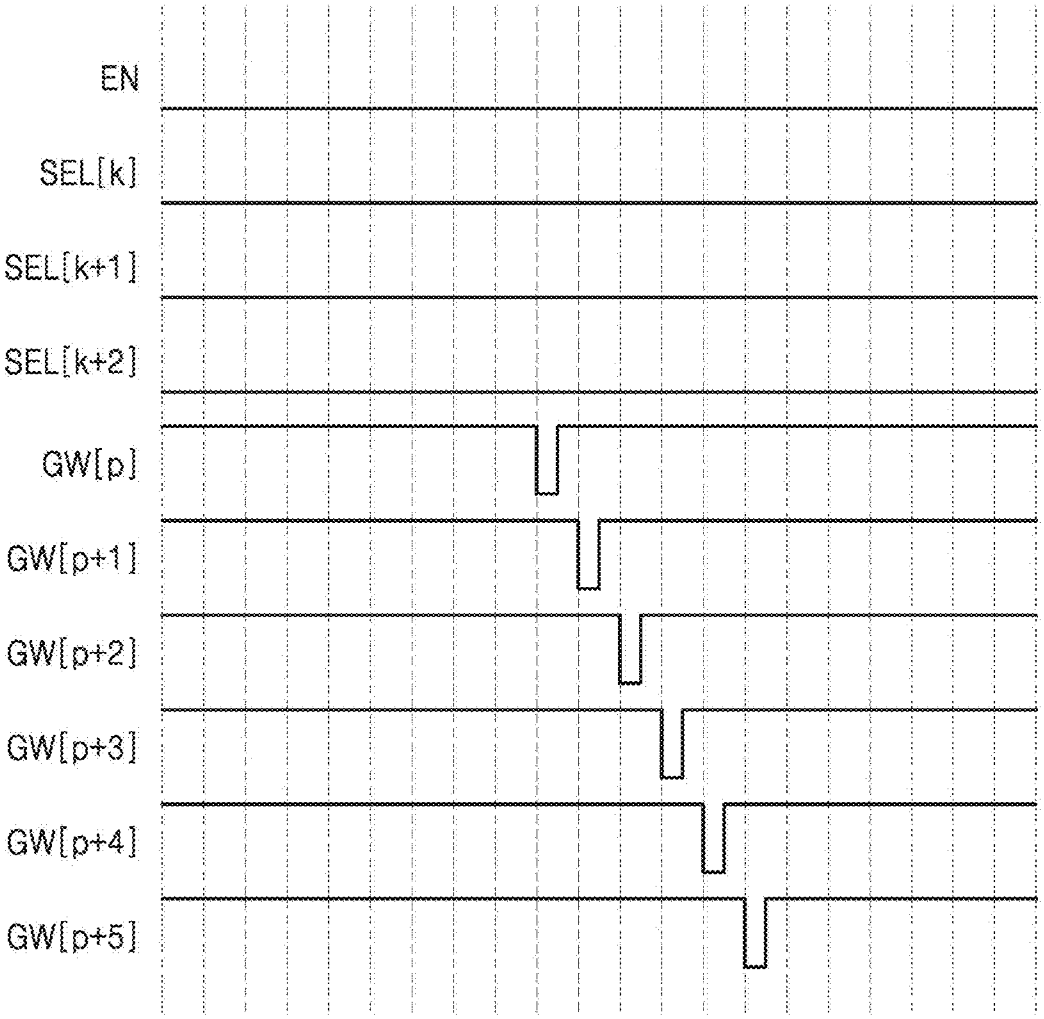
FIG. 21 is a signaling diagram showing outputs of a first driving circuit in a first driving mode according to an embodiment.
Figure 22:
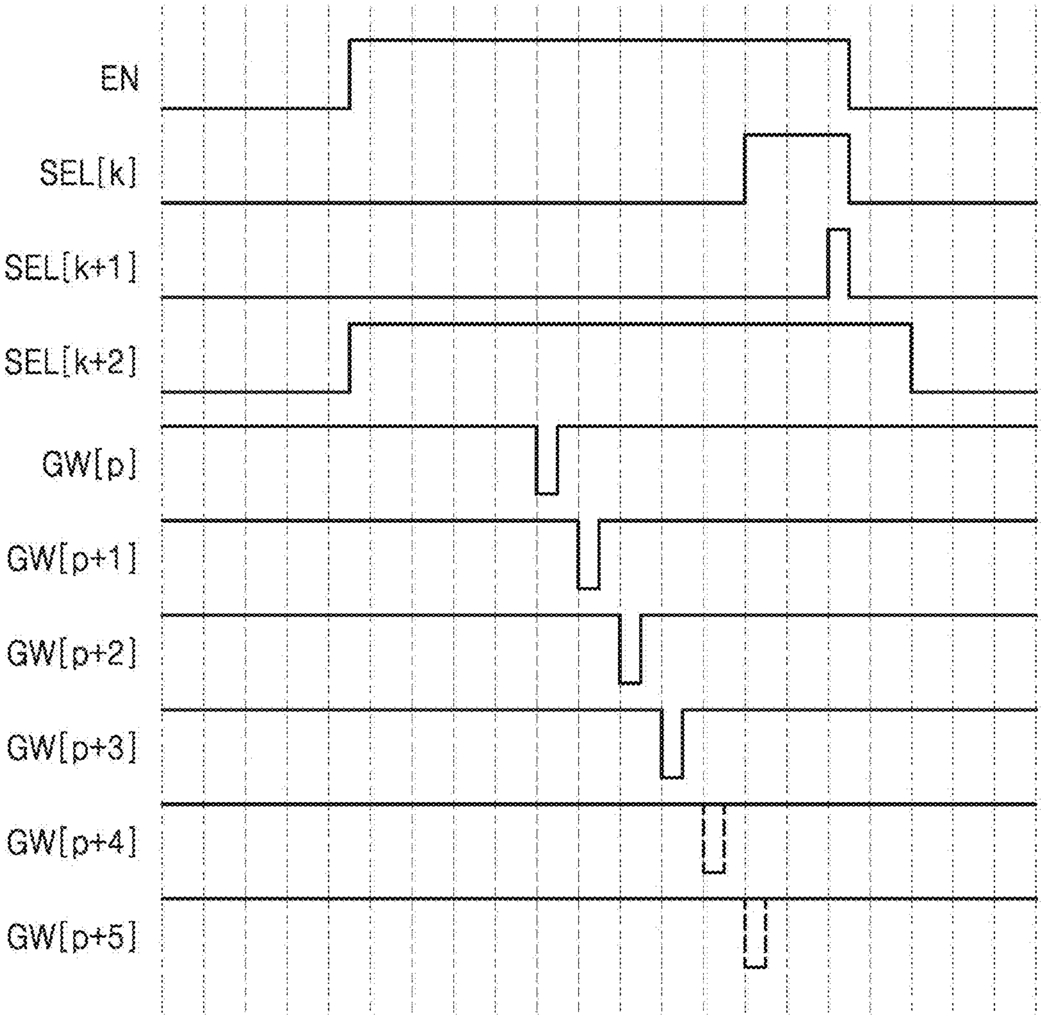
FIG. 22 is a signaling diagram showing outputs of a first driving circuit in a second driving mode according to an embodiment.

FIG. 19 is a block diagram schematically illustrating the first driving circuit 131 according to an embodiment. FIG. 20 is an equivalent circuit diagram schematically showing a stage WST of the first driving circuit 131 according to an embodiment. FIG. 21 is a signaling diagram showing outputs of the first driving circuit 131 in the first driving mode according to an embodiment. FIG. 22 is a signaling diagram showing outputs of the first driving circuit 131 in the second driving mode according to an embodiment.

Referring to FIG. 19, the first driving circuit 131 according to an embodiment may include a plurality of stages WST1 to WST2*n*.

The start signal STV may be input (e.g., may be supplied) to the input terminal IN of each of the stages WST1 to WST2*n*. The start signal STV may be an external signal GW_FLM, or a carry signal (hereinafter, referred to as a previous carry signal) output by a previous stage. The external signal GW_FLM may be input as the start signal STV to the input terminal IN of the first stage WST1, and previous carry signals CR_GW[1], . . . , CR_GW[p], CR_GW[p+1], CR_GW[p+2], CR_GW[p+3], . . . , CR_GW [2*n*−1] may be input as the start signals STV to the input terminals IN of the second to (n)th stages WST2 to WST2*n*, respectively.

The first voltage VGH may be input to the first voltage input terminal V1 of each of the stages WST1 to WST2*n*, and the second voltage VGL may be input to the second voltage input terminal V2 of each of the stages WST1 to WST2*n*. The second voltage VGL may be lower than the first voltage VGH.

A clock signal WCLK may be input to the clock terminal CK of each of the stages WST1 to WST2*n*. The clock signal WCLK may include first to fourth clock signals WCLK1 to WCLK4. According to an embodiment, the first to fourth clock signals WCLK1 to WCLK4 may be sequentially supplied to four stages (e.g. WST1 to WST4, and so on).

The first to fourth clock signals WCLK1 to WCLK4 may be square wave signals that repeat a high-level voltage and a low-level voltage. According to an embodiment, the first to fourth clock signals WCLK1 to WCLK4 may be square wave signals that repeat the first voltage VGH and the second voltage VGL. The first to fourth clock signals WCLK1 to WCLK4 may be signals in which phases thereof are shifted while having a same waveform as each other. For example, the second clock signal WCLK2 may be input in a same waveform as that of the first clock signal WCLK1, while phases thereof are shifted (e.g., the phases are delayed) by a suitable interval (e.g., a certain or predetermined interval).

In some embodiments, the reset signal ESR1 may be input to the reset terminals RS of the stages WST1 to WST2*n*, as shown in FIG. 20.

The selection signals SEL[1], . . . , SEL[k−2], SEL[k−1], SEL[k], SEL[k+1], . . . , SEL[n] may be input to the selection signal input terminals SIN of the stages WST1 to WST2*n*, respectively.

First gate signals GW[1], . . . , GW[p], GW[p+1], GW[p+2], GW[p+3], . . . , GW[2*n*] may be sequentially output from the output terminals GOUT of the stages WST1 to WST2*n*, respectively.

The previous carry signals CR_GW[1], . . . , CR_GW[p], CR_GW[p+1], CR_GW[p+2], CR_GW[p+3], . . . , CR_GW [2*n*-1] may be output from the carry terminals COUT of the stages WST1 to WST2*n*, respectively.

Referring to FIG. 20, each stage WST of the first driving circuit 131 may include a control circuit 131*a*, an output circuit 131*b*, and a masking circuit 131*c*. The control circuit 131*a*, the output circuit 131*b*, and the masking circuit 131*c* may each include at least one transistor. The at least one transistor may include an N-channel transistor and/or a P-channel transistor. For example, a fourth transistor T4 may be an N-channel transistor, and a first transistor T1, a second transistor T2, a third transistor T3, a fifth transistor T5, a sixth transistor T6, a seventh transistor T7, a ninth transistor T9, an eleventh transistor T11, and a twelfth transistor T12 may be P-channel transistors.

The control circuit 131*a* may control voltages of a first node GW_Q and a second node GW_QB in response to the start signal STV (e.g., the external signal GW_FLM described above with reference to FIG. 19 or a previous carry signal CR_GW'). The control circuit 131*a* may include the first to fourth transistors T1 to T4, the seventh transistor T7, and the first capacitor C1.

The first transistor T1 may be connected between the input terminal IN and the second transistor T2. The gate of the first transistor T1 may be connected to the clock terminal CK. The first transistor T1 is turned on when the clock signal WCLK input to the clock terminal CK is at a low level, and may transmit the start signal STV input to the input terminal IN to one terminal of the second transistor T2 and a gate of the third transistor T3 (e.g., a third node GW_A). The clock signal WCLK may be one of the first clock signal WCLK1, the second clock signal WCLK2, the third clock signal WCLK3, and the fourth clock signal WCLK4.

The second transistor T2 may be connected between the first transistor T1 and the first node GW_Q. The gate of the second transistor T2 may be connected to the second voltage input terminal V2. The second transistor T2 may be turned on by the second voltage VGL input to the second voltage input terminal V2, and may transmit the start signal STV received through the first transistor T1 to the first node GW_Q. The second transistor T2 may always be in a turned-on state.

The third transistor T3 may be connected between the first voltage input terminal V1 and the second node GW_QB. The gate of the third transistor T3 may be connected to the third node GW_A. The third transistor T3 may be turned on when the start signal STV transmitted to the third node GW_A is at a low level, and may transmit the first voltage VGH input to the first voltage input terminal V1 to the second node GW_QB.

The fourth transistor T4 may be connected between the second node GW_QB and the second voltage input terminal V2. The gate of the fourth transistor T4 may be connected to the first node GW_Q. The fourth transistor T4 may be turned on when a voltage of the first node GW_Q is at a high level, and may transmit the second voltage VGL input to the second voltage input terminal V2 to the second node GW_QB.

The third transistor T3 and the fourth transistor T4 may control a voltage of the second node GW_QB according to a voltage of the third node GW_A or the first node GW_Q.

The first capacitor C1 may be connected between the first voltage input terminal V1 and the second node GW_QB. The first capacitor C1 may maintain or substantially maintain a voltage of the second node GW_QB.

The seventh transistor T7 may be connected between the second node GW_QB and the second voltage input terminal V2. The gate of the seventh transistor T7 may be connected to the reset terminal RS. The seventh transistor T7 may be turned on when the reset signal ESR1 is at a low level, and may reset a voltage of the second node GW_QB to the second voltage VGL. The seventh transistor T7 may be omitted as needed or desired.

The output circuit **131*b* may include a first output circuit 131*b*1 and a second output circuit 131*b*2. The output circuit 131*b*** may be connected between the first voltage input terminal V1 and the second voltage input terminal V2.

The first output circuit **131*b*1 may output a carry signal CR_GW of a high-level voltage or a low-level voltage according to the voltages of the first node GW_Q and the second node GW_QB. The first output circuit 131*b*1 may include the fifth transistor T5 and the sixth transistor T6. The first output circuit 131*b*1** may further include the second capacitor C2 and the fourth capacitor C4.

The fifth transistor T5 may be connected between the first voltage input terminal V1 and the carry terminal COUT. The gate of the fifth transistor T5 may be connected to the second node GW_QB. The fifth transistor T5 may be a pull-up transistor to transmit a high-level voltage to the carry terminal COUT. The fifth transistor T5 may be turned on when the voltage of the second node GW_QB is at a low level, and may transmit the first voltage VGH of a high-level voltage to the carry terminal COUT.

The sixth transistor T6 may be connected between the carry terminal COUT and the fourth capacitor C4. The gate of the sixth transistor T6 may be connected to the first node GW_Q. The sixth transistor T6 may be a pull-down transistor to transmit a low-level voltage to the carry terminal COUT. The sixth transistor T6 is turned on when the voltage of the first node GW_Q is at a low level, and the carry signal CR_GW having a level according to the voltages of the first capacitor C1 and the fourth capacitor C4 may be output from the carry terminal COUT. The fourth capacitor C4 may be connected between the sixth transistor T6 and the carry terminal COUT.

The second output circuit **131*b*2 may output the first gate signal GW of a high-level voltage or a low-level voltage according to voltages of the second node GW_QB and a fifth node GW_QF. The second output circuit 131*b*2** may include the eleventh transistor T11 and the twelfth transistor T12.

The eleventh transistor T11 may be connected between the first voltage input terminal V1 and the output terminal GOUT. The gate of the eleventh transistor T11 may be connected to the second node GW_QB. The eleventh transistor T11 may be a pull-up transistor to transmit a high-level voltage to the output terminal GOUT. The eleventh transistor T11 may be turned on when the voltage of the second node GW_QB is at a low level, and may transmit the first voltage VGH of a high-level voltage to the output terminal GOUT.

The twelfth transistor T12 may be connected between the output terminal GOUT and the second voltage input terminal V2. The gate of the twelfth transistor T12 may be connected to the fifth node GW_QF. The twelfth transistor T12 may be a pull-down transistor to transmit a low-level voltage to the output terminal GOUT. The twelfth transistor T12 may be turned on when a voltage of the fifth node GW_QF is at a low level, and may transmit the second voltage VGL of a low-level voltage to the output terminal GOUT.

The masking circuit **131*c* may block (e.g., may mask) outputs of the first gate signal GW of a gate-on voltage (e.g., the low-level voltage) from the second output circuit 131*b*2, in response to the selection signal SEL. The masking circuit 131*c* may be located between the first node GW_Q and/or the second node GW_QB and the second output circuit 131*b*2. According to an embodiment, the masking circuit 131*c* may be located between the first node GW_Q and the second output circuit 131*b*2. The masking circuit 131*c* may block an electrical connection between the first node GW_Q and the second output circuit 131*b*2, when the selection signal SEL is at a high level. The masking circuit 131*c*** may further include the ninth transistor T9.

The ninth transistor T9 may be connected between the first node GW_Q and the fifth node GW_QF. The gate of the ninth transistor T9 may be connected to the selection signal input terminal SIN. The ninth transistor T9 is turned on when the selection signal SEL is at a low level, and may electrically connect the fifth node GW_QF to the first node GW_Q. The ninth transistor T9 is turned off when the selection signal SEL is at a high level, and may disconnect the fifth node GW_QF from the first node GW_Q.

While the ninth transistor T9 is in a turned-off state, when the voltage of the second node GW_QB is at a low level and the voltage of the first node GW_Q is at a high level, the first voltage VGH of a high-level voltage may be transmitted to the output terminal GOUT through the eleventh transistor T11. Accordingly, when the selection signal SEL is at a high level, the second output circuit **131*b*2** may not output the first gate signal GW of a low level.

According to an embodiment, each transistor in the stage WST may be a dual-gate transistor further including a back gate that receives a same signal as that of the gate thereof.

FIGS. 21 and 22 illustrate the first gate signals GW[p], GW[p+1], GW[p+2], GW[p+3], GW[p+4], and GW[p+5] output from the (p)th to (p+5)th stages WST of the first driving circuit 131. The (k)th selection signal SEL[k] may be input to the (p)th and (p+1)th stages WST, the (k+1)th selection signal SEL[k+1] may be input to the (p+2)th and (p+3)th stages WST, and the (k+2)th selection signal SEL [k+2] may be input to the (p+4)th and (p+5)th stages WST. For convenience of illustration, in the second driving mode, the (p+4)th stage WST to the (p+j)th stage WST of the first driving circuit 131 may correspond to pixel rows to which a driving frequency lower than the driving frequency of the first driving mode are applied.

Referring to FIG. 21, in the first driving mode, the selection signal SEL of a low level may be input to each stage WST of the first driving circuit 131. Accordingly, the ninth transistor T9 may be turned on, and the voltage level of the voltage of the fifth node GW_QF may become the same or substantially the same as the voltage level of the voltage of the first node GW_Q. When the voltage of the second node GW_QB is at a low level, the eleventh transistor T11 may be turned on, and the first gate signals GW[p], GW[p+1], GW[p+2], GW[p+3], GW[p+4], and GW[p+5] of a high level may be output. When the voltages of the first node GW_Q and the fifth node GW_QF are at a low level, the twelfth transistor T12 may be turned on, and the first gate signals GW[p], GW[p+1], GW[p+2], GW[p+3], GW[p+4], and GW[p+5] of a low level may be output.

Referring to FIG. 22, in the second driving mode, the selection signal SEL may be input to each stage WST of the first driving circuit 131. Stages (e.g., the (p)th to (p+3)th stages WST) to which the selection signal SEL of a low level is input may output the first gate signals GW[p], GW[p+1], GW[p+2], and GW[p+3] of a high level through the eleventh transistor T11 turned on when the voltage of the second node GW_QB is at a low level, and may output the first gate signals GW[p], GW[p+1], GW[p+2], and GW[p+3] of a low level through the twelfth transistor T12 turned on when the voltages of the first node GW_Q and the fifth node GW_QF are at a low level.

When the voltage of the second node GW_QB is at a low level and the voltages of the first node GW_Q and the fifth node GW_QF are at a high level, or when the voltage of the second node GW_QB is at a high level and the voltage of the first node GW_Q is at a low level, stages (e.g., the (p+4)th and (p+5)th stages WST) to which the selection signal SEL of a high level is input may not output the first gate signals GW[p+4] and GW[p+5] of a low level, but may output the first gate signals GW[p+4] and GW[p+5] at a high level.

The (p+4)th stage WST and the (p+5)th stage WST of the first driving circuit 131 may output the first gate signals GW[p+4] and GW[p+5] of a high level, based on the (k+2)th selection signal SEL[k+2] of a high level overlapping with a period in which the first gate signals GW[p+4] and GW[p+5] of a low level (e.g., a low-level signal indicated by a broken line shown in FIG. 22) are output.

The selection signal SEL of a high level is input to the (p+4)th stage WST to the (p+j)th stage WST from the (k+2)th stage MST to the (k+i)th stage MST, respectively, and the (p+4)th stage WST to the (p+j)th stage WST may each output the first gate signal GW of a high level.

Figure 23:
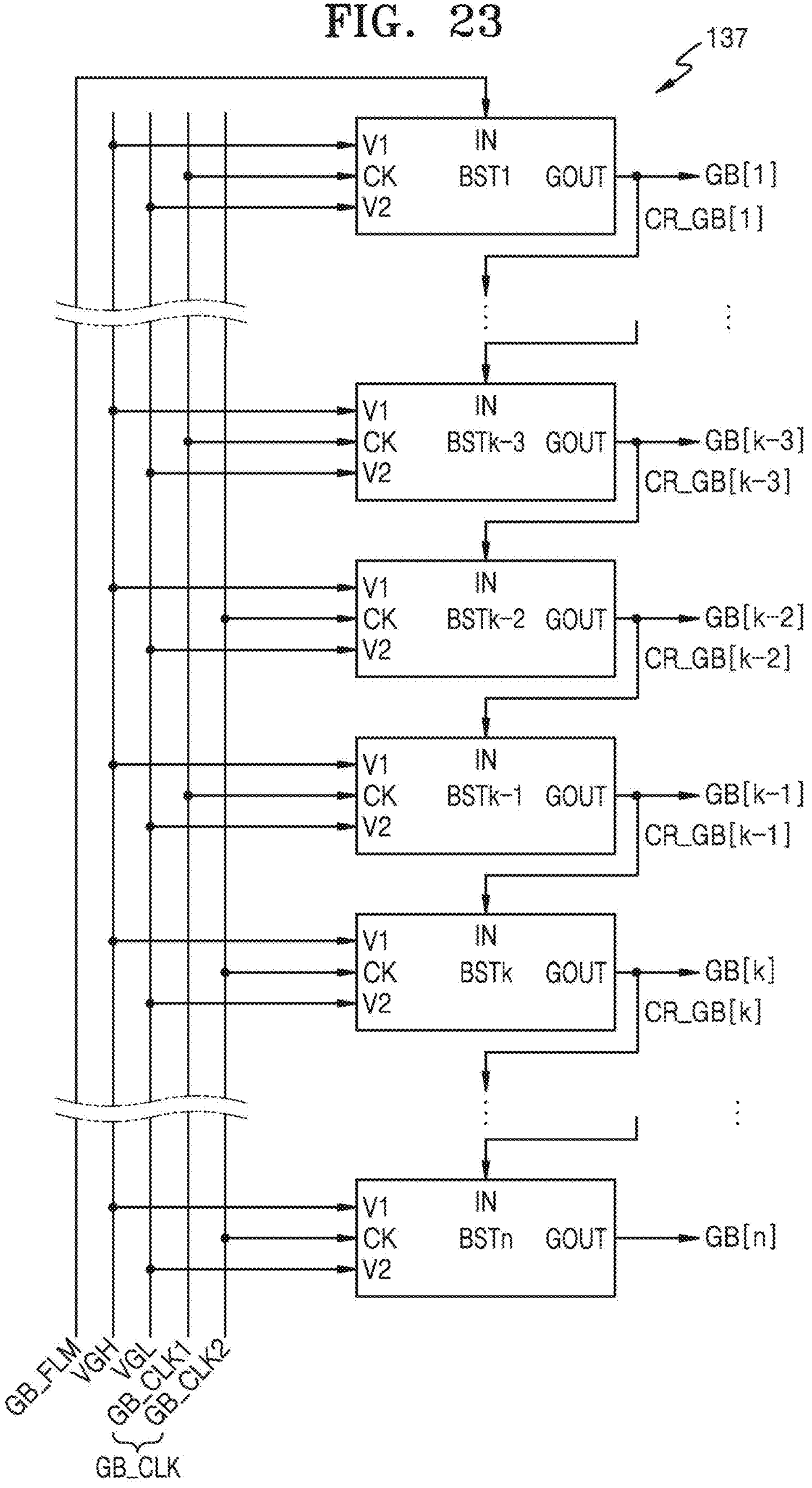
FIG. 23 is a block diagram schematically illustrating a fourth driving circuit according to an embodiment.

FIG. 23 is a block diagram schematically illustrating the fourth driving circuit 137 according to an embodiment.

Referring to FIG. 23, the fourth driving circuit 137 according to an embodiment may include a plurality of stages BST1 to BSTn.

The start signal STV may be input (e.g., may be supplied) to the input terminal IN of each of the stages BST1 to BSTn. The start signal STV may be an external signal GB_FLM, or a carry signal (hereinafter, referred to as a previous carry signal) output by a previous stage. The external signal GB_FLM may be input as the start signal STV to the input terminal IN of the first stage BST1, and previous carry signals CR_GB[1], . . . , CR_GB[k−3], CR_GB[k−2], CR_GB[k−1], CR_GB[k], . . . , CR_GB[n−1] may be input as the start signals STV to the input terminals IN of the second to (n)th stages BST2 to BSTn, respectively. According to an embodiment, a carry signal may be a fifth gate signal output by a previous stage.

The first voltage VGH may be input to the first voltage input terminal V1 of each of the stages BST1 to BSTn, and the second voltage VGL may be input to the second voltage input terminal V2 of each of the stages BST1 to BSTn. The second voltage VGL may be lower than the first voltage VGH.

A clock signal GB_CLK may be input to the clock terminal CK of each of the stages BST1 to BSTn. The clock signal GB_CLK may include a first clock signal GB_CLK1 and a second clock signal GB_CLK2. According to an embodiment, the first clock signal GB_CLK1 may be input to the clock terminal CK of the odd stages BST1, BST3, and so on, and the second clock signal GB_CLK2 may be input to the clock terminal CK of the even stages BST2, BST4, and so on. As another example, the second clock signal GB_CLK2 may be input to the clock terminal CK of the odd stages BST1, BST3, and so on, and the first clock signal GB_CLK1 may be input to the clock terminal CK of the even stages BST2, BST4, and so on.

The first clock signal GB_CLK1 and the second clock signal GB_CLK2 may be square wave signals that repeat a high-level voltage and a low-level voltage. According to an embodiment, the first clock signal GB_CLK1 and the second clock signal GB_CLK2 may be square wave signals that repeat the first voltage VGH and the second voltage VGL. The first clock signal GB_CLK1 and the second clock signal GB_CLK2 may be signals in which phases thereof are shifted while having a same waveform as each other. For example, the second clock signal GB_CLK2 may be input in a same waveform as that of the first clock signal GB_CLK1, while phases thereof are shifted (e.g., the phases are delayed) by a suitable interval (e.g., a certain or predetermined interval).

Fifth gate signals GB[1], . . . , GB[k−3], GB[k−2], GB[k−1], GB[k], . . . , GB[n] may be sequentially output from the output terminals GOUT of the stages BST1 to BSTn, respectively.

Figure 24:
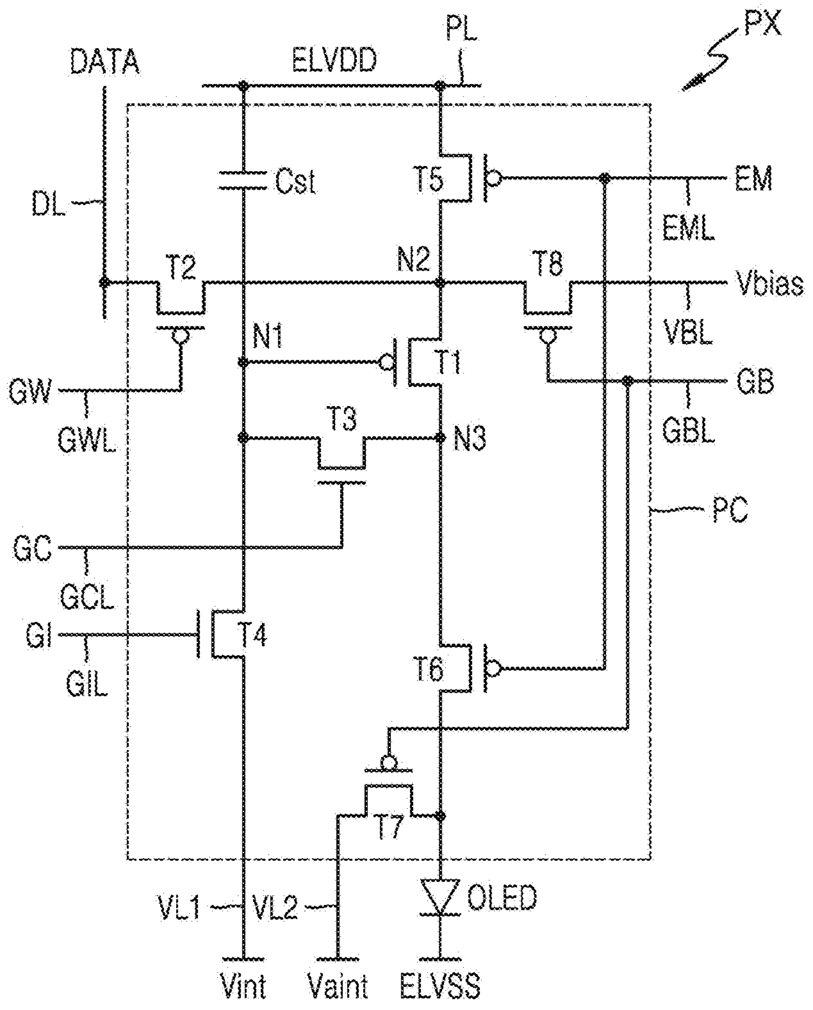
FIGS. 24 and 25 are equivalent circuit diagrams of a pixel according to one or more embodiments.
Figure 25:
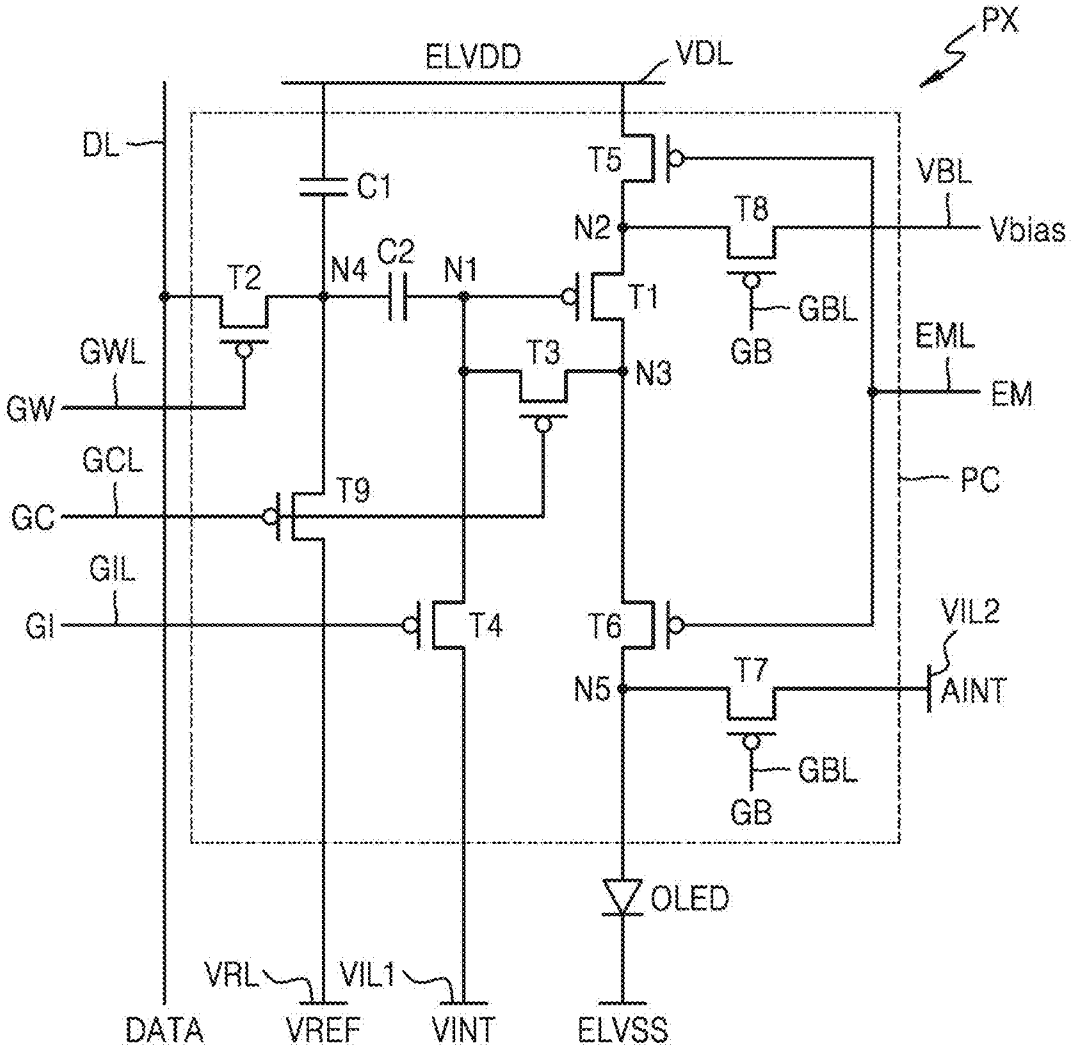

FIGS. 24 and 25 are equivalent circuit diagrams of the pixel PX according to one or more embodiments. The gate driving circuit 130 described above may be applied in the same or substantially the same manner to a display apparatus including the pixel PX of FIG. 24 and/or the pixel PX of FIG. 25.

The pixel PX of FIG. 24 may have the same or substantially the same configuration as that of the pixel PX described above with reference to FIG. 5, except that the pixel PX of FIG. 24 may further include an eighth transistor T8.

The eighth transistor T8 is connected to the second node N2, and may supply a bias voltage Vbias to the first terminal of the first transistor T1. The eighth transistor T8 may include a gate connected to the fifth gate line GBL, a first terminal for receiving the bias voltage Vbias, and a second terminal connected to the first terminal of the first transistor T1. The eighth transistor T8 may be turned on according to the fifth gate signal GB received through the fifth gate line GBL, and may compensate for a current characteristic change of the first transistor T1 by transmitting the bias voltage Vbias to the first terminal of the first transistor T1 to control a gate-source voltage of the first transistor T1.

The pixel PX of FIG. 25 may have the same or substantially the same configuration as that of the pixel PX described above with reference to FIG. 5, except that the pixel PX of FIG. 25 may further include an eighth transistor T8 and a ninth transistor T9, and may have a different capacitor connection. The first gate signal GW of a low level supplied to the pixel PX of FIG. 25 may not overlap with the third gate signal GC of a high level, and may be supplied between the third gate signal GC of the high level and the fourth gate signal EM of a low level.

The ninth transistor T9 may be connected between a fourth node N4 and a reference voltage line VRL, and may include a gate connected to the third gate line GCL. The ninth transistor T9 may be turned on according to the third gate signal GC received through the third gate line GCL, and may transmit a reference voltage VREF to the fourth node N4.

The first capacitor C1 may be connected between the driving voltage line VDL and the fourth node N4. The first capacitor C1 may store a voltage corresponding to a voltage difference between the driving voltage line VDL and the fourth node N4.

The second capacitor C2 may be connected between the fourth node N4 and the first node N1. The second capacitor C2 may store a voltage corresponding to a voltage difference between the first node N1 and the fourth node N4.

A display apparatus according to some embodiments of the present disclosure may display images with different driving frequencies for each area of a display area, and may include a masking driving circuit to control an output of a gate driving circuit, so that some gate signals are not supplied to a pixel according to a driving frequency for each area. The masking driving circuit may supply a selection signal to driving circuits to output gate signals (e.g., the second gate signal GI, the third gate signal GC, and the first gate signal GW) for performing operations used to write a data signal on a pixel during a non-emission period, for example, such as for gate initialization and threshold voltage compensation of a driving transistor and data writing, and may block an output of a gate signal of the driving circuits. The masking driving circuit may receive, as a start signal, a node signal from a driving circuit configured to output a gate signal (e.g., the fourth gate signal EM) for controlling a timing at which a driving current is supplied to a light-emitting element, from among a plurality of gate signals supplied to the pixel. The node signal may be a voltage input to a node (e.g., a first node Q or the pull-down node Npd) to which a gate of a pull-down transistor of the driving circuit is connected and in which a voltage level is controlled according to a voltage level of the start signal.

Figure 26:
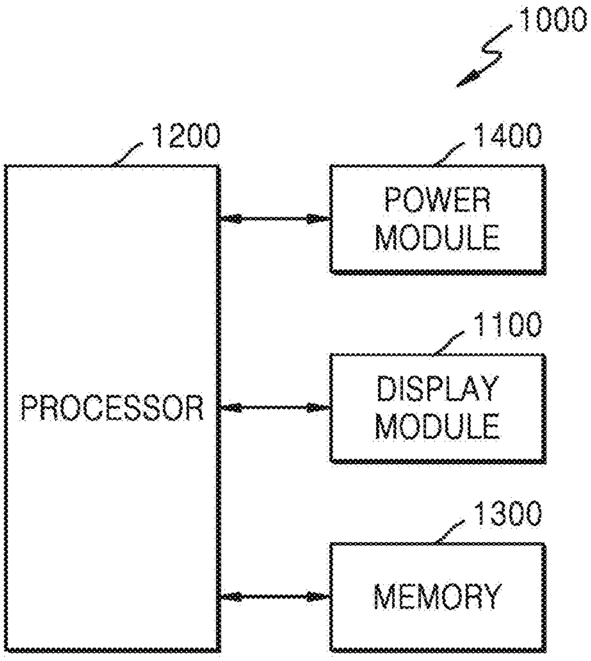
FIG. 26 is a block diagram of an electronic apparatus 1000 according to an embodiment.

FIG. 26 is a block diagram of an electronic apparatus 1000 according to an embodiment.

Referring to FIG. 26, the electronic apparatus 1000 according to an embodiment may include a display module 1100, a processor 1200, a memory 1300, and a power module 1400.

The electronic apparatus 1000 may output various pieces of information through the display module 1100 within an operating system.

The processor 1200 may include at least one of a central processing unit (CPU), an application processor (AP), a graphics processing unit (GPU), a communication processor (CP), an image signal processor (ISP), and a controller. According to an embodiment, the processor 1200 may be provided by being divided into two or more from a functional or structural perspective. For example, the processor 1200 may include a main processor in the form of a first drive chip including a CPU, and an auxiliary processor in the form of a second drive chip including a controller that receives an image signal from the main processor and processes the image signal to conform to the interface specifications of the display module 1100.

The memory 1300 may include at least one of a non-volatile memory and a volatile memory. The memory 1300 may store data information necessary for an operation of the processor 1200 or the display module 1100. When the processor 1200 executes an application stored in the memory 1300, an image data signal and/or an input control signal may be transmitted to the display module 1100, and the display module 1100 may process the received signal and output image information through a display screen.

The power module 1400 may include a power supply module, such as a power adapter or a battery device, and a power conversion module that converts power supplied by the power supply module to generate power necessary for an operation of the electronic apparatus 1000. Power conversion by the power conversion module may include, but is not limited to, DC-to-DC conversion, AC-to-DC conversion, and DC-to-AC conversion.

At least one of the components of the electronic apparatus 1000 described above may be included in the display apparatuses according to the above-described embodiments. In addition, some of the individual modules functionally included within a module may be included within a display apparatus, and the others may be provided separately from the display apparatus. For example, the display apparatus may include the auxiliary processor included in the processor 1200, and the display module 1100, and the main processor included in the processor 1200, the memory 1300, and the power module 1400 may be provided in the form of other devices within the electronic apparatus 1000 rather than the display apparatus. As another example, the power module 1400 may be provided within the display apparatus, and may supply power to the processor 1200 and the memory 1300 provided within the electronic apparatus 1000 other than the display apparatus. However, embodiments are not limited to the above examples.

Figure 27:
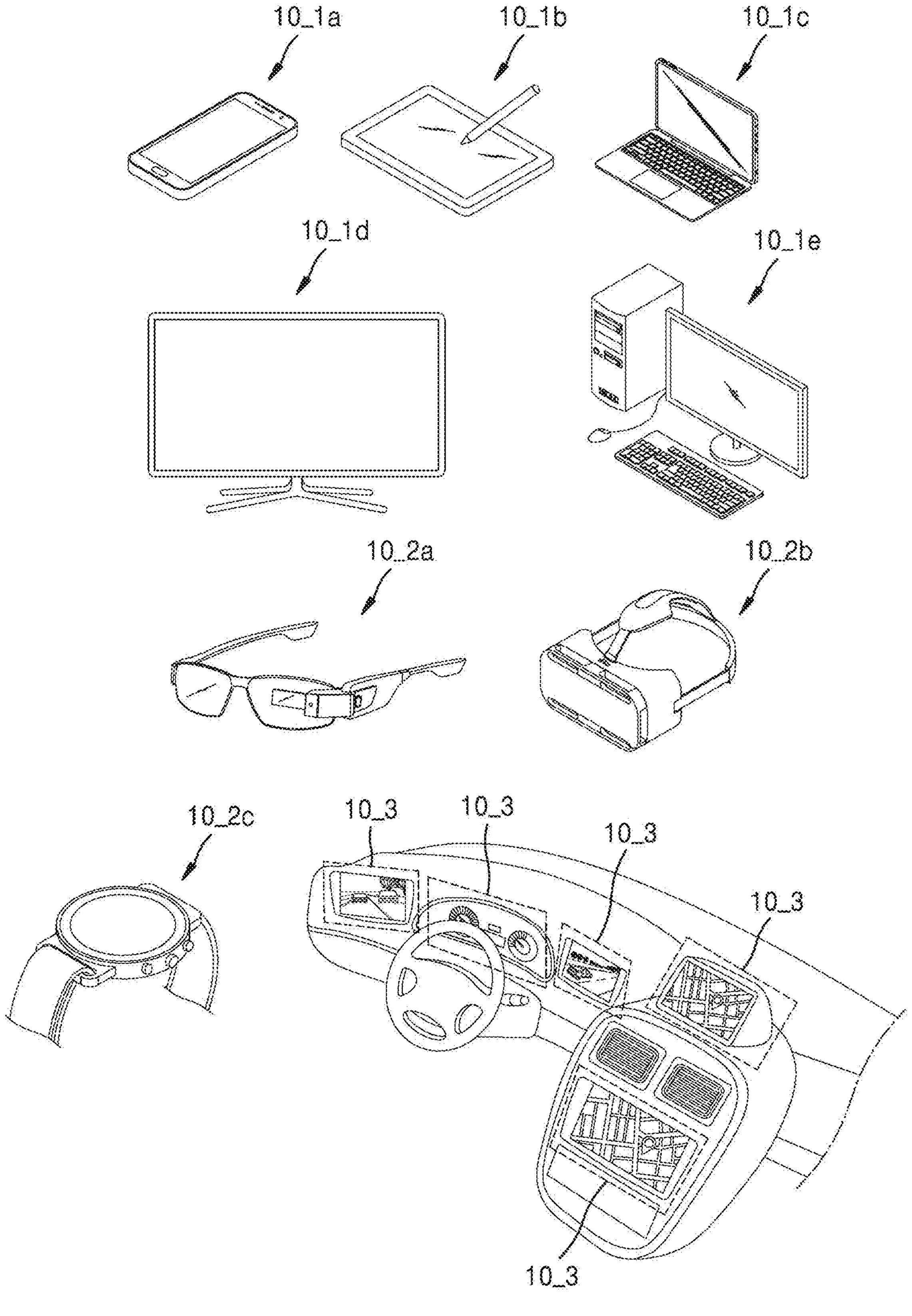
FIG. 27 is a schematic diagram of electronic apparatus according to various embodiments.

FIG. 27 is a schematic diagram of electronic apparatuses according to various embodiments.

Display apparatuses according to embodiments display a video or a still image, and are thus applicable to various electronic apparatuses. Referring to FIG. 27, various electronic apparatuses to which display apparatuses according to embodiments are applied may include not only image display electronic apparatuses (such as, a smartphone 10_1*a*, a tablet PC 10_1*b*, a laptop 10_1*c*, a TV 10_1*d*, and a desk monitor 10_1*e*), but also wearable electronic apparatuses including display modules (such as, smart glasses 10_2*a*, a head mounted display 10_2*b*, and a smart watch 10_2*c*, and vehicle electronic apparatuses 10_3 including display modules (such as, a center information display (CID) disposed on an instrument panel, center fascia, or dashboard of automobiles, and a room mirror display). The electronic apparatus according to embodiments are not limited to the above-described apparatuses.

The electronic apparatus of FIG. 27 may include the components illustrated in FIG. 26. For example, the smartphone 10_1*a* may include the display module 1100, the processor 1200, the memory 1300, and the power module 1400 illustrated in FIG. 26. The smartphone 10_1*a* may further include a communication module and a battery device. Power provided by the battery device may be converted through the power module 1400 and provided to the processor 1200, the memory 1300, and the display module 1100. According to an embodiment, a display apparatus applied to the smartphone 10_1*a* may include the display module 1100, and may further include the power module 1400. The processor 1200 and the memory 1300 may be provided in the form of chips mounted on a motherboard, which is an external device, but are not limited thereto.

According to some embodiments described above, a driving circuit of a display apparatus may be provided, in which an operating frequency changes in a portion of a display area. The driving circuit may be capable of blocking an output of a gate signal to an area in which the driving frequency changes, while the gate signal is output to an area in which the driving frequency is constant. However, the aspects and features of the present disclosure are not limited to those discussed above.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A driving circuit comprising a plurality of stages, each of the plurality of stages comprising:

a pull-up transistor configured to transmit a first voltage to an output terminal;

a pull-down transistor configured to transmit a second voltage lower than the first voltage to the output terminal; and a control transistor connected between a first terminal configured to receive an enable signal and a second terminal configured to output a selection signal, the control transistor comprising a gate connected to a gate of the pull-down transistor, wherein, when a voltage of the gate of the pull-down transistor is a gate-on voltage, the control transistor is configured to output the selection signal based on the enable signal, and the pull-down transistor is configured to transmit an output signal to the output terminal based on the second voltage.

2. The driving circuit of claim 1, wherein each of the plurality of stages further comprises:

a capacitor connected between a terminal configured to receive the second voltage and the second terminal; and a reset transistor connected between the terminal configured to receive the second voltage and the second terminal.

3. The driving circuit of claim 2, wherein, when the voltage of the gate of the pull-down transistor is the gate-on voltage, a gate of the reset transistor is configured to receive a reset signal of a gate-off voltage.

4. A display apparatus comprising:

a first driving circuit comprising a plurality of first stages;

a second driving circuit comprising a plurality of second stages; and a third driving circuit comprising a plurality of third stages, each of the plurality of third stages comprising a control transistor comprising a gate configured to receive a node signal from a corresponding second stage from among the plurality of second stages, the control transistor being configured to output a selection signal based on an enable signal that is input when a voltage of the gate of the control transistor is a gate-on voltage, wherein each of the plurality of first stages is configured to receive the selection signal from a corresponding third stage from among the plurality of third stages.

5. The display apparatus of claim 4, wherein each of the plurality of third stages further comprises:

a capacitor connected between a terminal configured to receive a second voltage and a second terminal; and a reset transistor connected between the terminal configured to receive the second voltage and the second terminal.

6. The display apparatus of claim 5, wherein, when a voltage of a gate of a pull-down transistor is the gate-on voltage, a gate of the reset transistor is configured to receive a reset signal of a gate-off voltage.

7. The display apparatus of claim 5, wherein some of consecutive third stages from among the plurality of third stages are configured to output selection signals of a low level, wherein others of the consecutive third stages from among the plurality of third stages are configured to output selection signals of a high level, and wherein lengths of high-level periods of the selection signals output by the others of the consecutive third stages are different from each other.

8. The display apparatus of claim 7, wherein first stages configured to receive the selection signals of the low level from among the plurality of first stages are configured to output first gate signals of the gate-on voltage, and wherein first stages configured to receive the selection signals of the high level from among the plurality of first stages are configured to output the first gate signals of a gate-off voltage.

9. The display apparatus of claim 5, wherein:

in a mode in which the display apparatus displays images with different driving frequencies for each area, the first stages from among the first stages, the second stages from among the second stages, and the third stages from among the third stages, which correspond to a first area configured to display an image with a driving frequency lower than a normal driving frequency, are determined, when the node signal of a first second stage from among the second stages corresponding to the first area is the gate-on voltage of the control transistor, an enable signal of a high level is input to the third driving circuit, the third stages corresponding to the first area are configured to output selection signals of the high level, the first stages corresponding to the first area are configured to output first gate signals of a gate-off voltage, and a starting point of the high level of the selection signals output by the third stages corresponding to the first area matches a starting point of the high level of the enable signal.

10. The display apparatus of claim 9, wherein third stages from among the third stages corresponding to a second area configured to display an image with the normal driving frequency are configured to output selection signals of a low level, and wherein first stages from among the first stages corresponding to the second area are configured to sequentially output first gate signals of the gate-on voltage.

11. The display apparatus of claim 10, wherein the second stages corresponding to the first area are configured to sequentially output second gate signals of the gate-off voltage, while the first stages corresponding to the first area are configured to output first gate signals of the gate-off voltage, and wherein second stages from among the second stages corresponding to the second area are configured to output the second gate signals of the gate-off voltage, while the first stages corresponding to the second area are configured to output the first gate signals of the gate-on voltage.

12. The display apparatus of claim 11, wherein each of a plurality of pixels in the first area and the second area comprises:

a driving transistor;

a first transistor configured to be turned on by one of the first gate signals of the gate-on voltage to transmit a data signal to the driving transistor; and a second transistor configured to be turned on by one of the second gate signals of the gate-on voltage to transmit a driving current corresponding to the data signal to a light-emitting element, and wherein a number of times the pixels in the first area receive the first gate signals of the gate-on voltage per second is less than a number of times the pixels in the second area receive the first gate signals of the gate-on voltage per second.

13. The display apparatus of claim 12, wherein a number of times the pixels in the first area receive the second gate signals of the gate-off voltage per second is the same as a number of times the pixels in the second area receive the second gate signals of the gate-off voltage per second.

14. The display apparatus of claim 12, further comprising a fourth driving circuit comprising a plurality of fourth stages, wherein each of the plurality of fourth stages is configured to receive the selection signal from a corresponding third stage from among the plurality of third stages, wherein each of the pixels in the first area and the second area further comprises a third transistor configured to be turned on by a third gate signal of the gate-on voltage to compensate for a threshold voltage of the driving transistor, and wherein a number of times the pixels in the first area receive the third gate signal of the gate-on voltage from the fourth driving circuit per second is less than a number of times the pixels in the second area receive the third gate signal of the gate-on voltage from the fourth driving circuit per second.

15. The display apparatus of claim 4, wherein each of the plurality of second stages comprises:

a pull-up transistor configured to transmit a first voltage to an output terminal; and a pull-down transistor configured to transmit a second voltage lower than the first voltage to the output terminal, and wherein the node signal comprises a voltage that is input to a gate of the pull-down transistor of each of the plurality of second stages.

16. The display apparatus of claim 4, wherein each of the plurality of first stages comprises:

a pull-up transistor configured to transmit a first voltage to an output terminal;

a pull-down transistor configured to transmit a second voltage lower than the first voltage to the output terminal; and a first masking transistor connected to a gate of the pull-down transistor, and comprising a gate configured to receive the selection signal.

17. The display apparatus of claim 16, wherein, in a mode in which the display apparatus is configured to display images with different driving frequencies for each area, the selection signal is a gate-off voltage of the first masking transistor.

18. The display apparatus of claim 17, wherein each of the plurality of first stages further comprises a second masking transistor connected to a gate of the pull-up transistor, the second masking transistor comprising a gate configured to receive the selection signal.

19. A driving circuit comprising a plurality of stages, each of the plurality of stages comprising:

a pull-up transistor configured to transmit a first voltage to an output terminal;

a pull-down transistor configured to transmit a second voltage lower than the first voltage to the output terminal; and a first masking transistor connected between a first node configured to receive a voltage level of a start signal and a gate of the pull-down transistor, the first masking transistor comprising a gate configured to receive a selection signal, wherein, in a mode in which a display apparatus is configured to display images with different driving frequencies for each area, the selection signal is a gate-off voltage of the first masking transistor.

20. The driving circuit of claim 19, wherein each of the plurality of stages further comprises a second masking transistor connected between a second node configured to receive a voltage level opposite to the voltage level of the start signal and the gate of the pull-up transistor, the second masking transistor comprising a gate configured to receive the selection signal.

21. An electronic apparatus comprising:

a pixel area; and a driving circuit configured to drive a plurality of pixels in the pixel area, the driving circuit comprising a plurality of stages, each of the stages comprising:

a pull-up transistor configured to transmit a first voltage to an output terminal;

a pull-down transistor configured to transmit a second voltage lower than the first voltage to the output terminal; and a control transistor connected between a first terminal configured to receive an enable signal and a second terminal configured to output a selection signal, the control transistor comprising a gate connected to a gate of the pull-down transistor, wherein, when a voltage of the gate of the pull-down transistor is a gate-on voltage, the control transistor is configured to output the selection signal based on the enable signal, and the pull-down transistor is configured to transmit an output signal to the output terminal based on the second voltage.

22. The electronic apparatus of claim 21, wherein each of the plurality of stages further comprises:

a capacitor connected between a terminal configured to receive the second voltage and the second terminal; and a reset transistor connected between the terminal configured to receive the second voltage and the second terminal.

23. The electronic apparatus of claim 22, wherein, when the voltage of the gate of the pull-down transistor is the gate-on voltage, a gate of the reset transistor is configured to receive a reset signal of a gate-off voltage.

* * * * *